various US patents.

(12) United States Patent
Nakatani et al.

(10) Patent No.: US 7,760,590 B2
(45) Date of Patent: Jul. 20, 2010

(54) DATA RECORDING METHOD, DATA RECORDING APPARATUS, AND DATA RECORDING PROGRAM

(75) Inventors: Akihiko Nakatani, Kanagawa (JP); Takashi Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 827 days.

(21) Appl. No.: 11/514,895

(22) Filed: Sep. 5, 2006

(65) Prior Publication Data

US 2007/0061025 A1     Mar. 15, 2007

(30) Foreign Application Priority Data

Sep. 13, 2005 (JP) ............................. 2005-266103

(51) Int. Cl.
*G11B 21/08* (2006.01)
(52) U.S. Cl. ................ 369/30.12; 369/30.1; 369/30.01; 369/47.29; 369/47.31; 369/47.34
(58) Field of Classification Search ............. 369/47.16, 369/59.26, 60, 30.01, 30.12, 30.3; 711/156; 704/501
See application file for complete search history.

(56) References Cited

U.S. PATENT DOCUMENTS

| | | | | |
|---|---|---|---|---|
| 5,414,686 A | * | 5/1995 | Iitsuka | 369/47.29 |
| 5,793,724 A | * | 8/1998 | Ichikawa et al. | 369/47.31 |
| 6,061,767 A | * | 5/2000 | Kuo et al. | 711/156 |
| 6,859,421 B2 | * | 2/2005 | Sawabe et al. | 369/30.01 |
| 2002/0196714 A1 | * | 12/2002 | Tada et al. | 369/30.12 |
| 2002/0196718 A1 | * | 12/2002 | Okazaki et al. | 369/47.34 |
| 2004/0037182 A1 | * | 2/2004 | Hayashi | 369/47.16 |
| 2005/0237865 A1 | * | 10/2005 | Ando et al. | 369/30.3 |
| 2006/0164927 A1 | * | 7/2006 | Kato et al. | 369/30.01 |
| 2006/0206341 A1 | * | 9/2006 | Lokhoff et al. | 704/501 |

FOREIGN PATENT DOCUMENTS

| | | |
|---|---|---|
| JP | 2002-108397 | 4/2002 |
| JP | 2002-111507 | 4/2002 |
| JP | 2004-260661 | 9/2004 |

OTHER PUBLICATIONS

Ye Wang et al., "A compressed domain beat detector using MP3 audio bit streams", ACM, 2001, pp. 194-202.*

* cited by examiner

*Primary Examiner*—Thuy N Pardo
(74) *Attorney, Agent, or Firm*—Oblon, Spivak, McClelland, Maier & Neustadt, L.L.P.

(57) ABSTRACT

A data recording method is disclosed which includes the steps of: firstly recording audio data onto a temporary storage medium following retrieval of the audio data from an external storage medium in response to an audio data import request; detecting whether a leading frame of the audio data held on the temporary storage medium references a preceding frame; and secondly recording the audio data held on the temporary storage medium to a storage medium in accordance with an outcome of the detecting step.

5 Claims, 14 Drawing Sheets

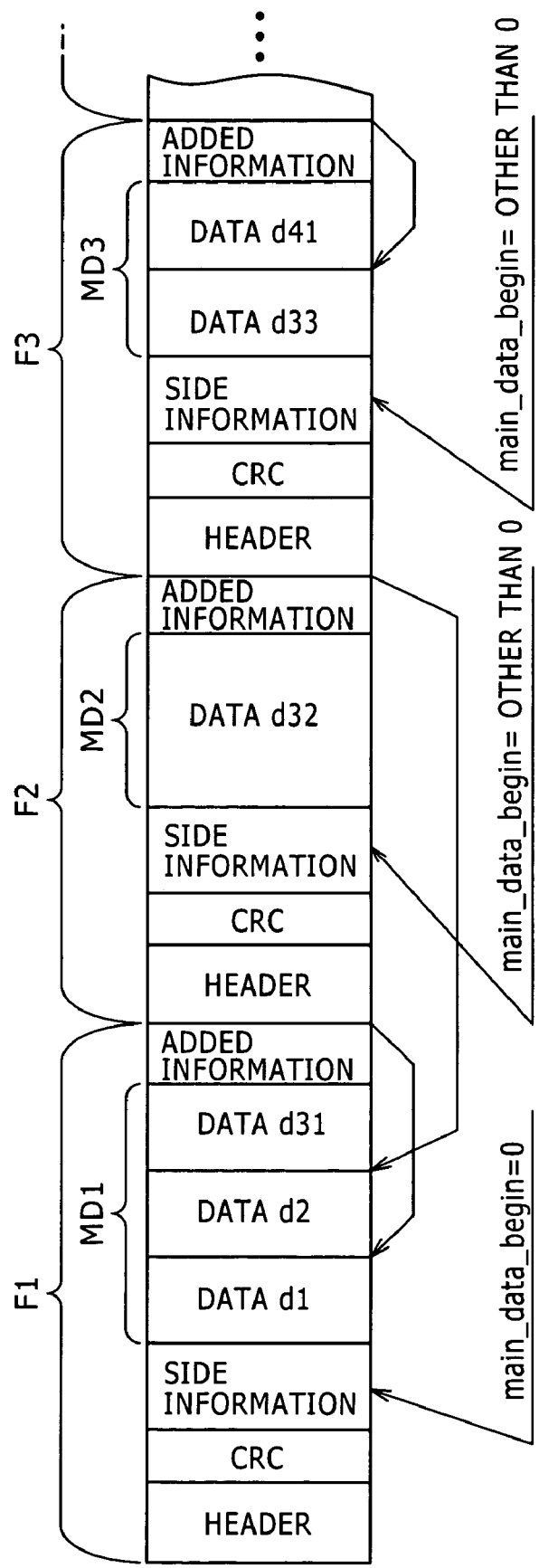

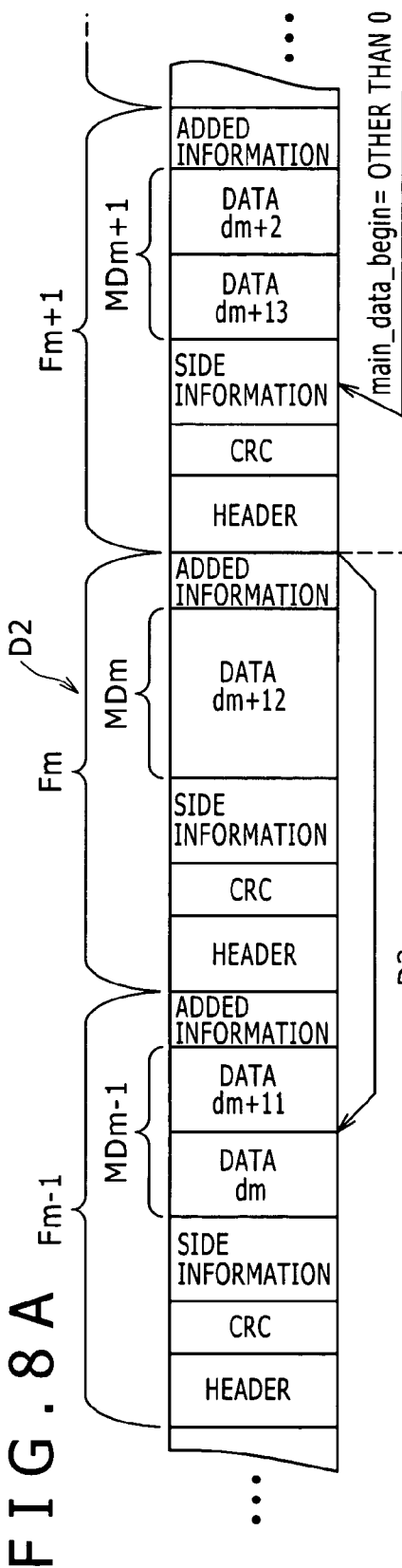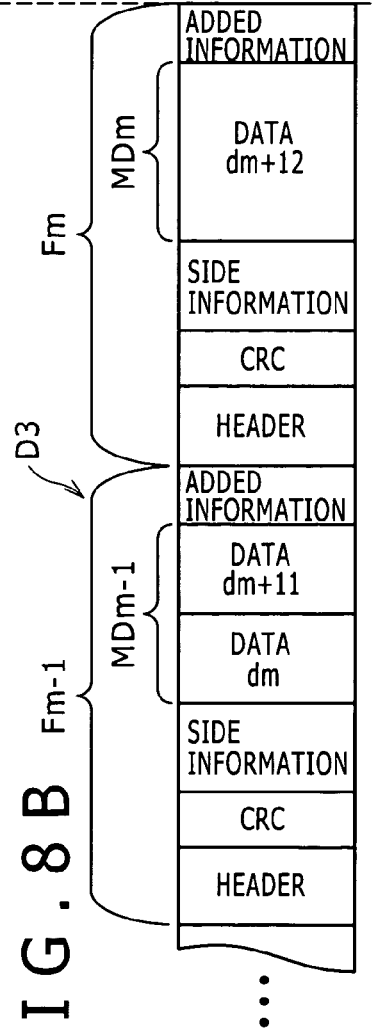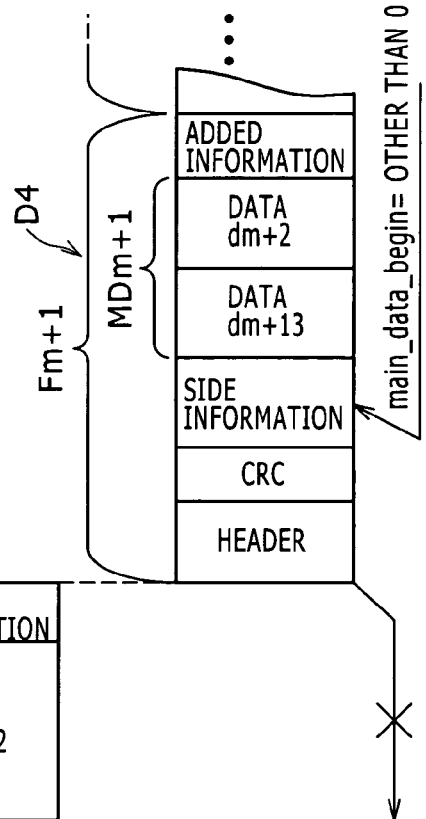

FIG.10
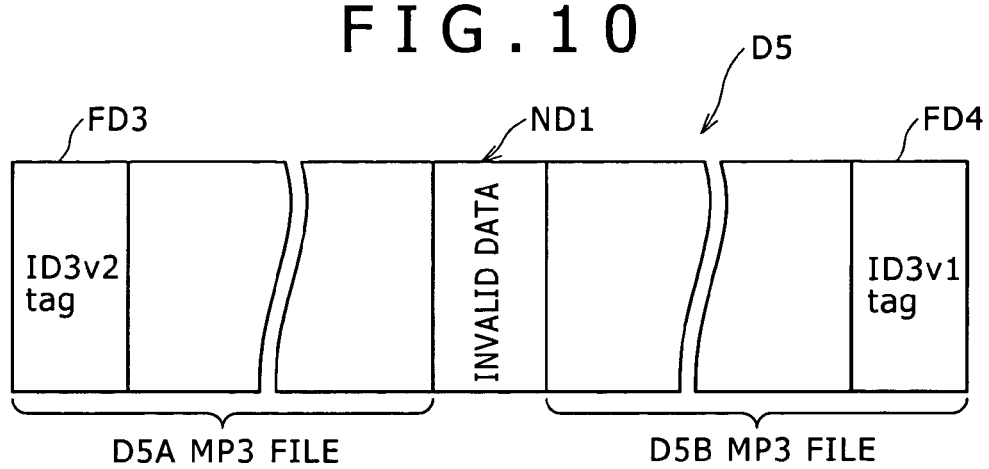
FIG.11A
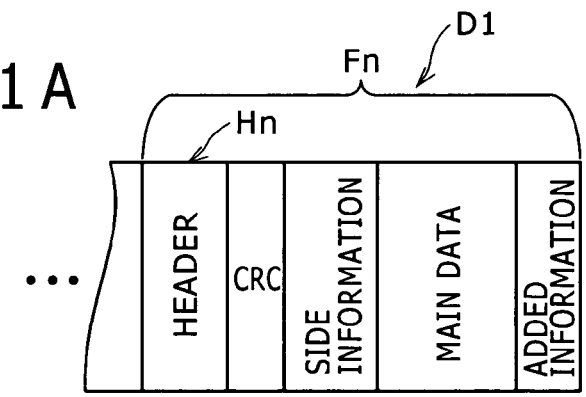
FIG.11B
FIG.11C
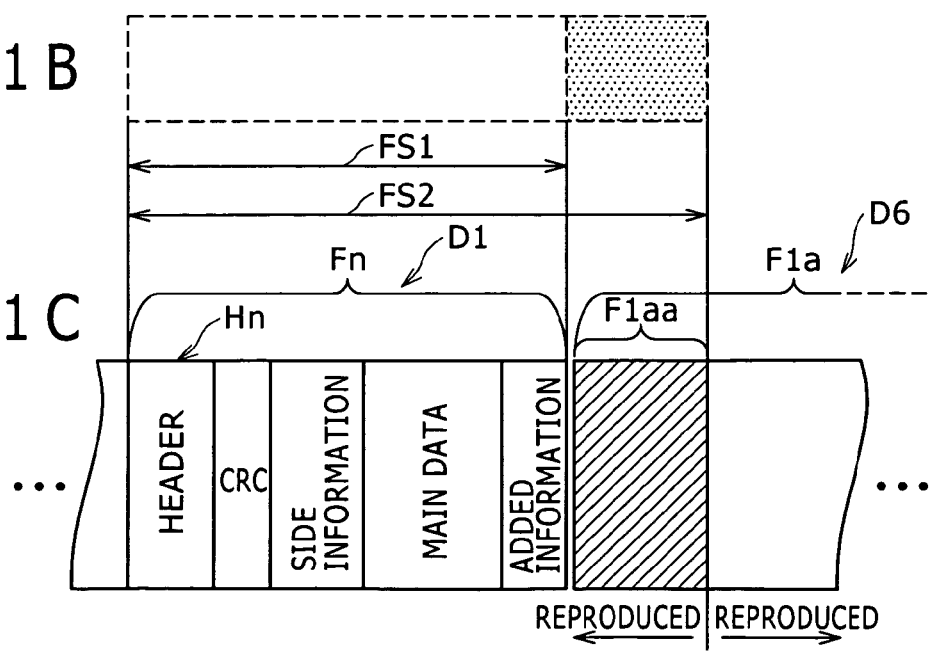

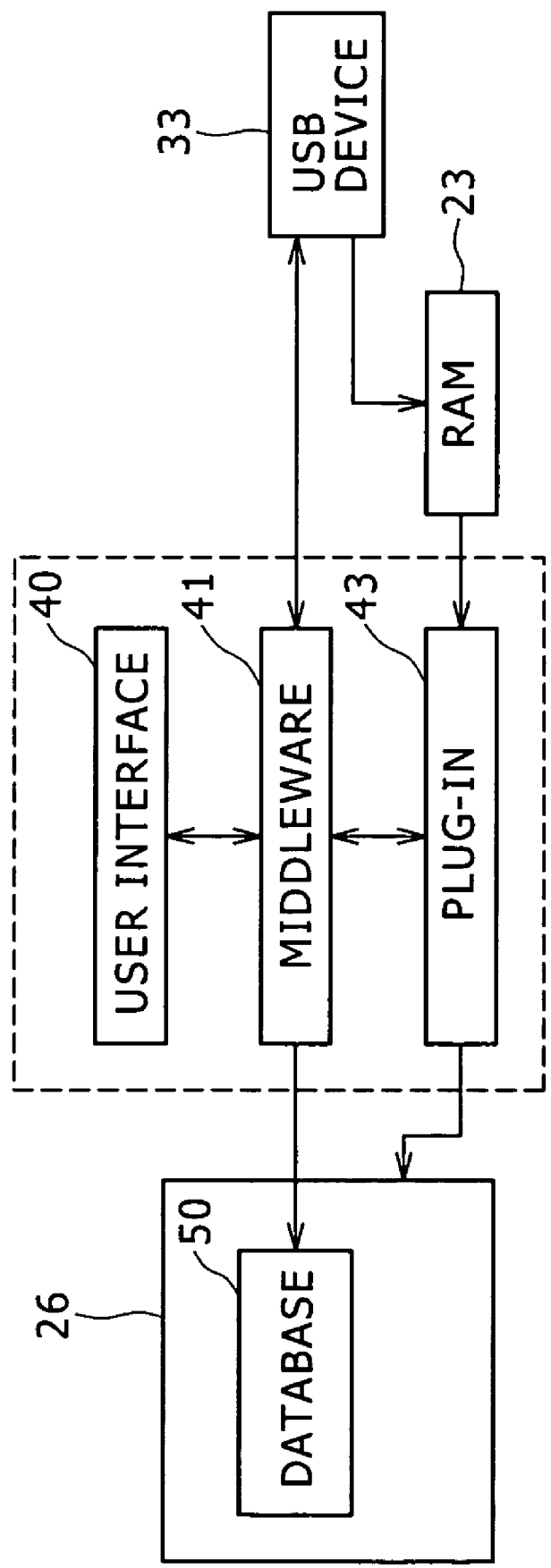

DATA RECORDING METHOD, DATA RECORDING APPARATUS, AND DATA RECORDING PROGRAM

CROSS REFERENCES TO RELATED APPLICATIONS

The present invention contains subject matter related to Japanese Patent Application JP 2005-266103 filed in the Japanese Patent Office on Sep. 13, 2005, the entire contents of which being incorporated herein by reference.

BACKGROUND OF THE INVENTION

1. Field of the Invention

The present invention relates to a data recording method, a data recording apparatus, and a data recording program. More particularly, the invention relates to a content recording and reproducing apparatus for recording and reproducing music contents.

2. Description of the Related Art

The usual method for reproducing compressed audio data involves doing editing work in such a manner that a trailing cluster of first-half compressed audio data is overlaid with a leading cluster of second-half compressed audio data when compressed audio data items of which each frame header is preceded by a data item corresponding to that header are split into frames. When reproducing two compressed audio data items continuously, the usual method compares a predetermined cluster front data item at the end of the compressed audio data item to be reproduced first, with a predetermined cluster front data item at the head of the compressed audio data item to be reproduced next. In the case of a match between the two predetermined cluster front data items, the usual method permits reproduction of the leading part of the second compressed audio data item to be reproduced next (e.g., see Japanese Patent Laid-open No. 2002-108397, pp. 2-3, FIG. 1).

SUMMARY OF THE INVENTION

When reproducing two compressed audio data items continuously, the usual compressed audio data reproducing method is arranged to perform the above-outlined process of determining whether the leading part of the second compressed audio data item can be reproduced, in addition to decoding the two compressed audio data items. This arrangement can result in a significantly increased processing load when compressed audio data items are reproduced continuously.

The present invention has been made in view of the above circumstances and provides a data recording method, a data recording apparatus, and a data recording program whereby any significant increase in processing load is prevented during continuous reproduction of audio data.

According to one embodiment of the present invention, a data recording method includes the steps of: firstly recording audio data onto a temporary storage medium following retrieval of the audio data from an external storage medium in response to an audio data import request; detecting whether a leading frame of the audio data held on the temporary storage medium references a preceding frame; and secondly recording the audio data held on the temporary storage medium to a storage medium in accordance with an outcome of the detecting step.

According to the inventive data recording method devised as outlined above, audio data is recorded to the storage medium in such a manner that the recorded data may be retrieved from the medium and reproduced as a whole with no additional processes carried out during subsequent consecutive audio data reproduction.

According to other embodiments of the present invention, there are also provided a data recording apparatus and a data recording program whereby audio data is recorded onto a temporary storage medium following retrieval of the data from an external storage medium in response to an audio data import request. A check is then made to detect whether a leading frame of the audio data held on the temporary storage medium references a preceding frame. The audio data held on the temporary storage medium is recorded to a storage medium in accordance with an outcome of the detection. The inventive data recording method, apparatus, and program thus make it possible to record the audio data to the storage medium in such a manner that the recorded data may be retrieved from the medium and reproduced as a whole with no additional processes carried out during subsequent consecutive reproduction of the audio data.

BRIEF DESCRIPTION OF THE DRAWINGS

FIG. 7 is another schematic view explanatory of how split coded music data is stored with regard to frames (part 2);

FIGS. 8A, 8B, and 8C are schematic views explanatory of how an MP3 file is split edited;

FIG. 10 is a schematic view explanatory of an MP3 file containing invalid data;

FIGS. 11A, 11B, and 11C are schematic views explanatory of an erroneous size of a trailing frame;

FIG. 12 is a block diagram explanatory of how MP3 files are recorded;

DETAILED DESCRIPTION OF THE PREFERRED EMBODIMENTS

Preferred embodiments of the present invention will now be described with reference to the accompanying drawings.

(1) Outline of an Embodiment

Figure 1:
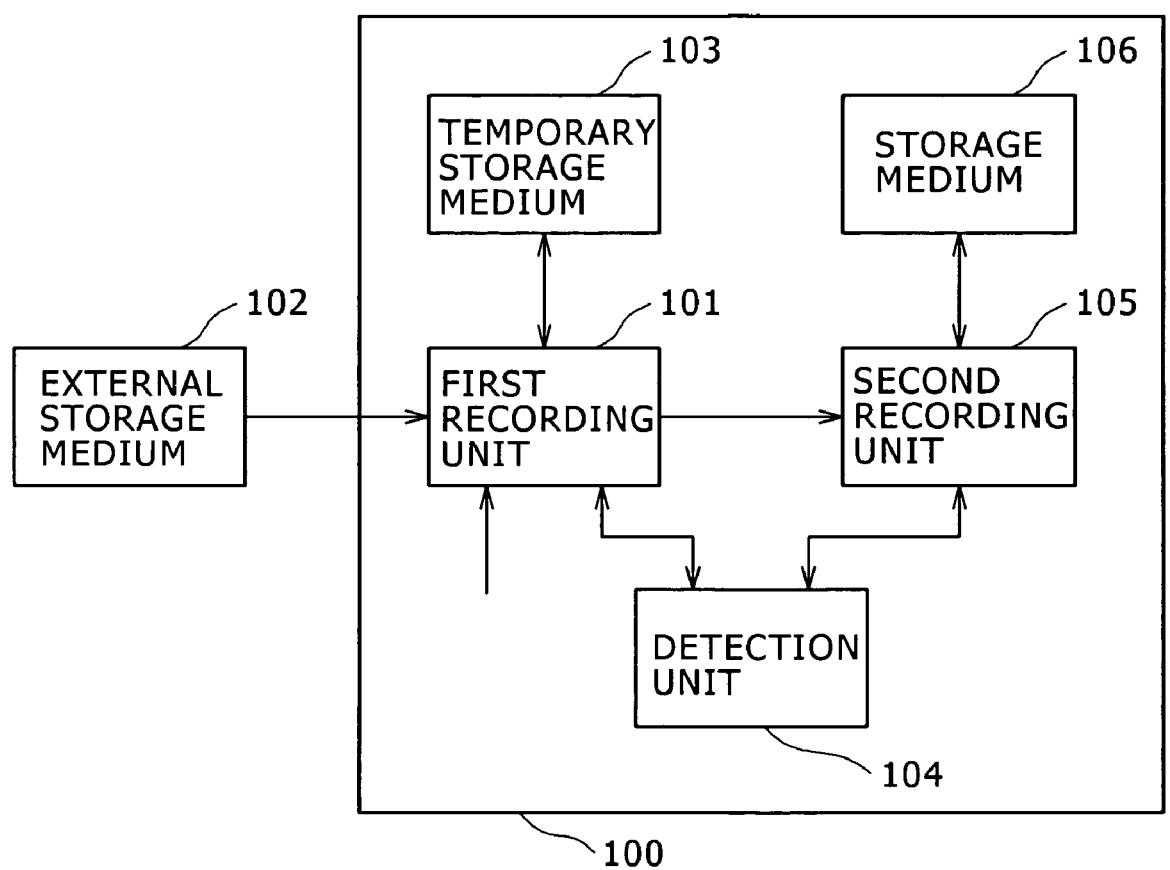
FIG. 1 is a block diagram outlining a data recording apparatus according to an embodiment of the present invention.

In FIG. 1, reference numeral 100 stands for a data recording apparatus embodying the present invention. In the data recording apparatus 100, a first recording unit 101 records audio data to a temporary storage medium 103 following retrieval of the data from an external storage medium 102 in response to an audio data import request. A detection unit 104 in the data storing apparatus 100 detects whether a leading frame of the audio data recorded to the temporary storage medium 103 by the first recording unit 101 references a preceding frame. A second recording unit 105 in the data recording apparatus 100 records the audio data held on the temporary storage medium 103 to a storage medium 106 in accordance with an outcome of the detection by the detection unit 104. The storage medium 106 may be either incorporated in the data recording apparatus 100 or attached externally to the apparatus 100.

(2) Implementation of the Embodiment

Figure 2:
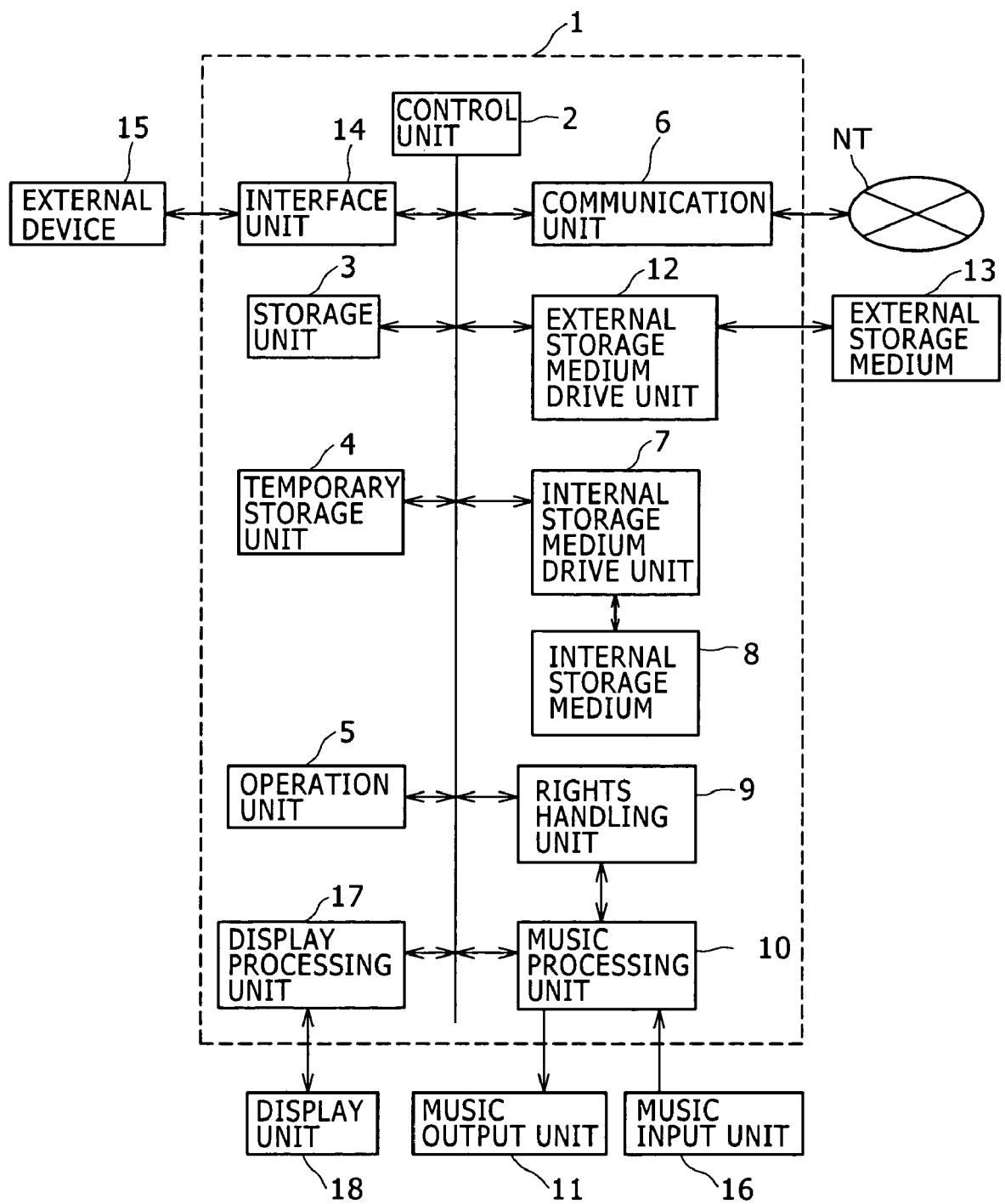
FIG. 2 is a block diagram showing a circuit structure of functional blocks constituting a content recording and reproducing apparatus according to an embodiment of the present invention.

In FIG. 2, reference numeral 1 denotes a content recording and reproducing apparatus of which a typical functional structure is shown, the apparatus 1 being designed to record and reproduce music contents. A control unit 2 reads various programs from a storage unit 3 and loads the retrieved programs into a temporary storage unit 4 for execution in order to control the content recording and reproducing apparatus 1 as a whole. The control unit 2 also carries out other diverse processes.

Illustratively, the control unit 2 may come to recognize that the user has operated the operation unit 5 with a view to importing music contents from a content delivery server (not shown) on a network NT. In that case, the control unit 2 sends a music content delivery request signal to the content delivery server on the network NT by way of a communication unit 6.

Upon receipt of the request signal from the content recording and reproducing apparatus 1, the content delivery server charges the user for delivery of the requested music contents. At the same time, the content delivery server sends encrypted music data representing the requested music contents (called the encrypted music data hereunder) and rights information granting the user the right to use the music contents in question, to the content recording and reproducing apparatus 1 over the network NT. The rights information may illustratively include source data constituting a decryption key for decrypting the encrypted music data (i.e., decryption key seed), content use conditions specifying the number of times the music contents are allowed to be reproduced and/or transferred, and content use status describing how may times the music contents have actually been reproduced and/or transferred.

The control unit 2 of the content recording and reproducing apparatus 1 receives through the communication unit 6 the encrypted music data and the accompanying rights information from the content delivery server. The received data and information are recorded to an internal storage medium 8 driven and controlled by an internal storage medium drive unit 7.

As described, the content recording and reproducing apparatus 1 is designed to acquire (i.e., download) music contents from the content delivery server on the network NT and record the acquired music contents to the internal storage medium 8.

Later, the control unit 2 may recognize that the user has operated the operation unit 5 to give instructions to reproduce the music contents recorded on the internal storage medium 8. In such a case, in response to the user's operations, the control unit 2 retrieves from the internal storage medium 8 the encrypted music data representing the music contents and the accompanying rights information. The rights information is forwarded to a rights handling unit 9 while the encrypted music data is sent to a music processing unit 10.

The rights handling unit 9 checks to determine whether the rights information coming from the internal storage medium 8 is valid. If the received rights information is found to be valid, the rights handling unit 9 gives permission to use (i.e., to reproduce, in this case) the encrypted music data corresponding to the rights information. The rights handling unit 9 proceeds to generate a decryption key for decrypting the encrypted music data in accordance with the rights information, and hands the generated decryption key over to the music processing unit 10. The rights handling unit 9 and music processing unit 10 are interconnected by a dedicated path. The decryption key is sent and received through the dedicated path so that the key will not be acquired illegally from the outside.

Using the decryption key sent from the rights handling unit 9, the music processing unit 10 decrypts the encrypted music data coming from the internal storage medium 8 into music data. The music processing unit 10 further performs decoding, digital-to-analog conversion, amplification, and other processes successively on the music data so as to acquire a music signal. The music signal thus obtained is output to an external music output unit 11 which in turn outputs music based on the received music signal.

This is how the content recording and reproducing apparatus 1 reproduces music contents recorded on the internal storage medium 8.

The control unit 2 of the content recording and reproducing apparatus 1 also retrieves music data from an external storage medium 13 driven and controlled by an external storage medium drive unit 12 in response to the user's operations on the operation unit 5. The music processing unit 10 then performs decoding, digital-to-analog conversion, amplification, and other processes successively on the retrieved music data so as to acquire a music signal. The music output unit 11 outputs music based on the music signal thus acquired.

In addition, the control unit 2 responding to the user's operations on the operation unit 5 may read music data from an external device 15 connected through an interface unit 14. The music processing unit 10 likewise performs decoding, digital-to-analog conversion, amplification, and other processes successively on the retrieved music data so as to acquire a music signal. The music output unit 11 outputs music based on the music signal thus obtained.

Furthermore, a music signal may be input from an external music input unit 16 to the music processing unit 10 in response to the user's operations on the operation unit 5. The control unit 2 may then cause the music processing unit 10 to carry out analog-to-digital conversion, equalizing, digital-to-analog conversion, amplification, and other processes successively on the input music signal in order to acquire a music signal. The acquired music signal is sent to the music output unit 11 which in turn outputs music accordingly.

As described, the content recording and reproducing apparatus 1 is designed to reproduce not only the music contents recorded on the external storage medium 13 or in the external device 15 but also the music contents input from the music input unit 16. If the music contents held on the external storage medium 13 or in the external device 15 turn out to be encrypted music data accompanied by corresponding rights information like the above-mentioned music contents acquired from the content delivery server, the music contents need only be reproduced in the same manner as those acquired from the server and recorded onto the internal storage medium 8.

The control unit 2 responding to the user's operations on the operation unit 5 may further read music data from the external storage medium 13 or external device 15 and cause the music processing unit 10 to encode the retrieved music data. At the same time, the encoded data is encrypted by the control unit 2 into encrypted music data using the encryption key supplied from the rights handling unit 9. The encrypted music data is recorded to the internal storage medium 8 in association with the rights information created at this point by the rights handling unit 9.

In addition, the control unit 2 responding to the user's operations on the operation unit 5 may cause the music processing unit 10 to perform analog-to-digital conversion, encoding, and other processes successively on the music signal sent from the music input unit 16 to the music processing unit 10. The processed signal is encrypted by the control unit 2 into encrypted music data by use of the encryption key given by the rights handling unit 9. The encrypted music data is thereupon recorded to the internal storage medium 8 in association with the rights information created at the same time by the rights handling unit 9.

As described, the content recording and reproducing apparatus 1 is designed to record to the internal storage medium 8 not only the music contents held on the external storage medium 13 or in the external device 15 but also the music data input from the music input unit 16. Upon recording to the internal storage medium, the music data may be encrypted and may be associated with the corresponding rights information on an as-needed basis (i.e., in keeping with the user's operations on the operation unit 5). In other words, the music data retrieved from the external storage medium 13 or external device 15 may be recorded to the internal storage medium 8 without getting encrypted or associated with rights information. Furthermore, the music signal input from the music input unit 16 may be subjected to analog-to-digital conversion, encoding, and other processes performed successively by the music processing unit 10, whereby music data is obtained. The acquired music data may then be recorded unmodified to the internal storage medium 8.

Also responding to the user's operations on the operation unit 5, the control unit 2 may retrieve either music data or encrypted music data and the accompanying rights information from the internal storage medium 8 and record what is retrieved to the external storage medium 13 or external device 15. That is, the content recording and reproducing apparatus 1 is capable of transferring the music contents held on the internal storage medium 8 to the outside.

In addition, the control unit 2 sends to a display processing unit 17 display-ready data resulting from the execution of various programs retrieved from the storage unit 3 (e.g., for acquisition, reproduction, recording, or transfer of music contents). In turn, the display processing unit 17 causes an external display unit 18 to display screens based on the display-ready data coming from the control unit 2. In this manner, the content recording and reproducing apparatus 1 allows the user visually to check various screens on the display unit 18 regarding the acquisition, reproduction, recording, or transfer of music contents.

The music output unit 11, external device 15, music input unit 16, and display unit 18 may be externally connected to the content recording and reproducing apparatus 1 through suitable cables. Alternatively, these units may be attached directly to and inside of the enclosure of the content recording and reproducing apparatus 1.

Figure 3:
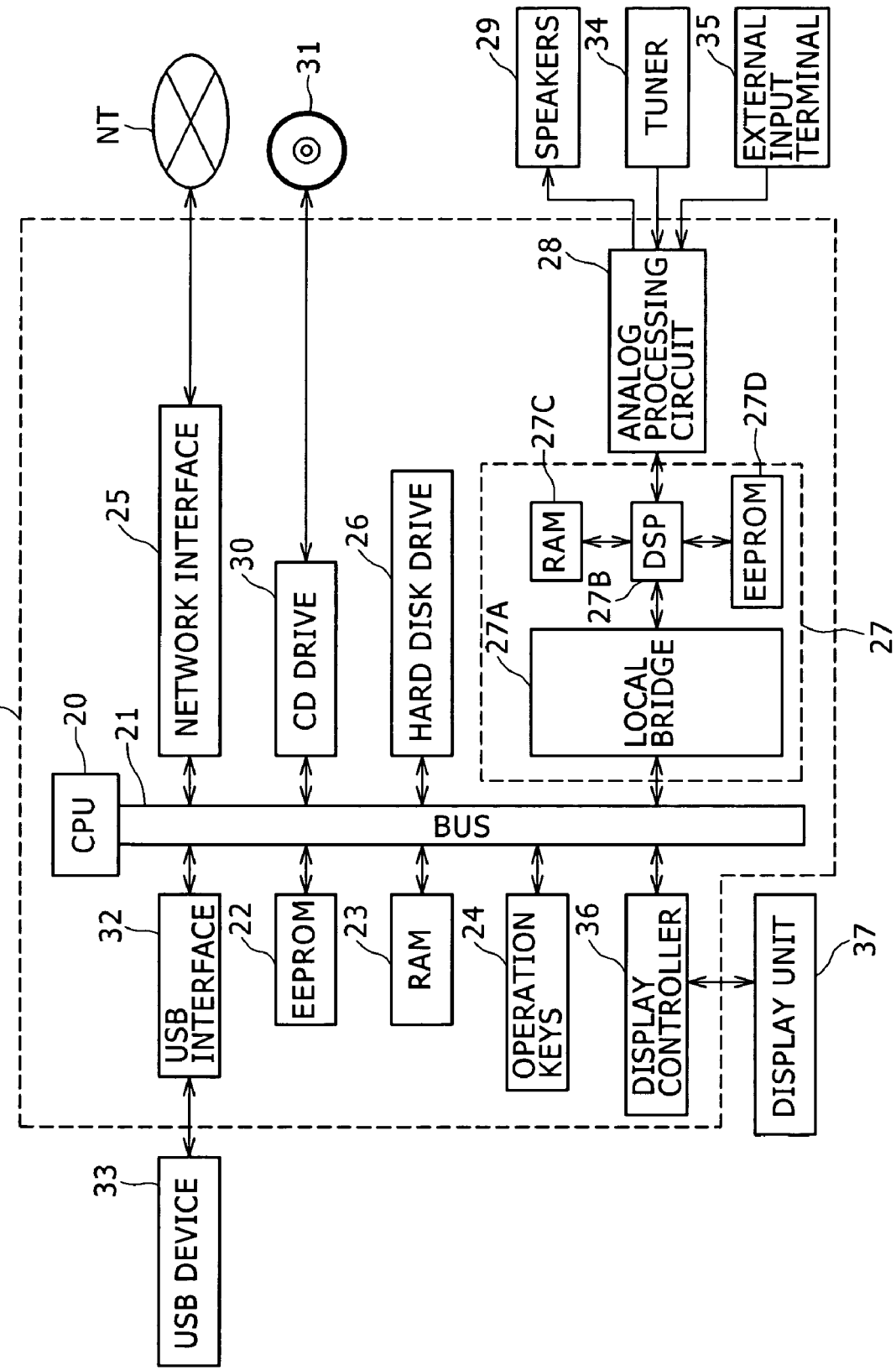
FIG. 3 is a block diagram showing a circuit structure of hardware blocks constituting the inventive content recording and reproducing apparatus.

Described below with reference to FIG. 3 is how the above-described content recording and reproducing apparatus 1 is typically implemented in terms of hardware. In this hardware structure, a CPU (Central Processing Unit) 20 is connected to other hardware components via a bus 21. In operation, the CPU 20 reads various programs from an EEPROM (Electronically Erasable and Programmable Read Only Memory) 23 and loads the retrieved programs into a RAM (Random Access Memory) 23 for execution in order to control the content recording and reproducing apparatus 1 as a whole. The CPU 20 also carries out other diverse processes.

Illustratively, the CPU 20 may come to recognize that the user has operated operation keys 24 on the enclosure of the content recording and reproducing apparatus 1 to import music contents from the content delivery server (not shown) on the network NT. In that case, the CPU 20 sends a music content delivery request signal to the content delivery server on the network NT by way of a network interface 25.

Upon receipt of the request signal from the content recording and reproducing apparatus 1, the content delivery server charges the user for delivery of the requested music contents. At the same time, the content delivery server sends encrypted music data representing the requested music contents and rights information granting the user the right to use the music contents in question, to the content recording and reproducing apparatus 1 over the network NT. The rights information may illustratively include source data constituting a decryption key for decrypting the encrypted music data (i.e., decryption key seed), content use conditions specifying the number of times the music contents are allowed to be reproduced and/or transferred, and content use status describing how may times the music contents have actually been reproduced and/or transferred.

The CPU 20 of the content recording and reproducing apparatus 1 receives through the network interface 25 the encrypted music data and the accompanying rights information from the content delivery server. The received data and information are recorded to a hard disk drive 26.

As described, the content recording and reproducing apparatus 1 is designed to acquire (i.e., download) music contents from the content delivery server on the network NT and record the acquired music contents to the hard disk drive 26.

Later, the CPU 20 may recognize that the user has operated the operation keys 24 to give instructions to reproduce the music contents recorded on the hard disk drive 26. In such a case, in response to the user's operations, the CPU 20 retrieves from the hard disk drive 26 the encrypted music data representing the music contents and the accompanying rights information. The retrieved rights information and encrypted music data are sent to a rights handling and music processing module 27.

The rights handling and music processing module 27, a multiple-chip module concealed from outside the module, is connected via a local bridge 27A to the bus 21 external to the module. The rights handling and music processing module 27 is further connected to an analog processing circuit 28 outside the module through a DSP (Digital Signal Processor) 27B connected to the local bridge 27A. When encrypted firmware for use by the DSP 27B is read by the CPU 20 from the hard disk drive 26 and supplied to the rights handling and music processing module 27, the local bridge 27A decrypts the firmware and stores the decrypted firmware temporarily in a RAM 27C. The firmware in the RAM 27C when executed by the DSP 27B carries out the same processes as those performed by the rights handling unit 9 and music processing unit 10 (in digital processing) in the above-described content recording and reproducing apparatus 1. The rights handling and music processing module 27 has an EEPROM 27D which is accessible by the DSP 27B and which accommodates secret information to be concealed from outside the module.

The rights handling and music processing module 27 inputs encrypted music data and its accompanying rights information coming from the hard disk drive 26 to the DSP 27B by way of the local bridge 27A. The DSP 27B checks to determine whether the rights information is valid. If the rights information is found to be valid, the DSP 27B gives permission to use (i.e., to reproduce, in this case) the encrypted music data. On the basis of the rights information, the DSP 27B generates a decryption key for decrypting the encrypted music data and proceeds to decrypt the encrypted music data using the generated decryption key into music data. The DSP 27B further performs decoding and other digital processes on the music data and outputs the digitalized music data to the analog processing circuit 28.

The analog processing circuit 28 performs digital-to-analog conversion, amplification, and other analog processes on the digitalized music data so as to acquire a music signal, and outputs the acquired music signal to the speakers 29 located outside. In turn, the speakers 29 output music based on the received music signal.

This is how the content recording and reproducing apparatus 1 reproduces the music contents recorded on the hard disk drive 26.

In response to the user's operations on the operation keys 24, the CPU 20 of the content recording and reproducing apparatus 1 retrieves music data from a CD (Compact Disc) 31 loaded in a CD drive 30. The rights handling and music processing module 27 performs decoding and other digital processes on the retrieved music data. Then the analog processing circuit 28 carries out digital-to-analog conversion, amplification, and other analog processes on the music data in order to obtain a music signal. The resulting music signal is sent to the speakers 29 which in turn output music based on the received music signal.

Also responding to the user's operations on the operation keys 24, the CPU 20 retrieves music data from a USB (Universal Serial Bus) device 33 that may be connected through a USB interface 32. The retrieved music data is subjected to decoding and other digital processes by the rights handling and music processing module 27, before being submitted to digital-to-analog conversion, amplification, and other analog processes by the analog processing circuit 28, whereby a music signal is acquired. The resulting music signal is forwarded to the speakers 29 which output music based on the received music signal.

In response to the user's operations on the operation keys 24, the CPU 20 further admits a music signal coming from a tuner 34 or from an external input terminal 35 into the analog processing circuit 28. In turn, the analog processing circuit 28 performs analog-to-digital conversion and other analog processes on the input music signal. Thereafter the rights handling and music processing module 27 carries out equalizing and other digital processes on the music signal coming from the analog processing circuit 28. The analog processing circuit 28 further executes digital-to-analog conversion and other analog processes on the music signal fed from the rights handling and music processing module 27 so as to obtain a music signal. The music signal thus acquired is sent to the speakers 29 which output music based on the received music signal.

As described, the content recording and reproducing apparatus 1 is capable of reproducing the music contents recorded on the CD 31 or in the USB device 33 as well as the music contents input from the tuner 34 or through the external input terminal 35. If the music contents derived from the CD 31 or from the USB device 33 turn out to be encrypted music data accompanied by corresponding rights information as in the case of the music contents downloaded from the above-mentioned content delivery server, the music contents need only be reproduced in the same manner as those acquired from the server and recorded onto the hard disk drive 26.

The CPU 20 responding to the user's operations on the operation keys 24 may further read music data from the CD 31 or from the USB device 33 and cause the rights handling and music processing module 27 to encode the retrieved music data. At the same time, the encoded data is encrypted by the rights handling and music processing module 27 into encrypted music data using the encryption key the module 27 has generated. The encrypted music data is recorded to the hard disk drive 26 in association with the rights information created at this point by the rights handling and music processing module 27.

In addition, the CPU 20 responding to the user's operations on the operation keys 24 may cause the analog processing circuit 28 to perform analog-to-digital conversion and other analog processes on the music signal sent from the tuner 34 or from the external input terminal 35 to the circuit 28. The processed music signal is subjected to encoding and other digital processes by the rights handling and music processing module 27. At the same time, the encoded music signal is encrypted by the rights handling and music processing module 27 into encrypted music data using the encryption key the module 27 has generated. The encrypted music data is recorded to the hard disk drive 26 in association with the rights information created at this point by the rights handling and music processing module 27.

As described, the content recording and reproducing apparatus 1 is designed to record to the hard disk drive 26 not only the music contents held on the CD 31 or in the USB device 33 but also the music contents input from the tuner 34 or from the external input terminal 35. Upon recording to the hard disk drive 26, the music data may be encrypted and may be associated with the corresponding rights information on an as-needed basis (i.e., in keeping with the user's operations on the operation keys 24). In other words, the music data retrieved from the CD 31 or USB device 33 may be recorded to the hard disk drive 26 without getting encrypted or associated with rights information. Furthermore, the music signal input from the tuner 34 or external input terminal 35 may be subjected to analog and digital processes performed successively by the analog processing circuit 28 and rights handling and music processing module 27, whereby music data is obtained. The acquired music data may then be recorded unmodified to the hard disk drive 26.

Also responding to the user's operations on the operation keys 24, the CPU 20 may retrieve either music data or encrypted music data and the accompanying rights information from the hard disk drive 26 and record what is retrieved to the CD 31 or to the USB device 33. That is, the content recording and reproducing apparatus 1 is capable of transferring the music contents held on the hard disk drive 26 to the outside.

In addition, the CPU 20 sends to a display controller 36 display-ready data resulting from the execution of various programs retrieved from the EEPROM 22 (e.g., for acquisition, reproduction, recording, or transfer of music contents). In turn, the display controller 36 causes an external display unit 37 to display screens based on the display-ready data coming from the CPU 20. In this manner, the content recording and reproducing apparatus 1 allows the user visually to check various screens on the display unit 37 regarding the acquisition, reproduction, recording, or transfer of music contents.

The speakers 29, USB device 33, tuner 34, external input terminal 35, and display unit 37 may be externally connected to the content recording and reproducing apparatus 1 through suitable cables. Alternatively, these units may be attached directly to and inside of the enclosure of the content recording and reproducing apparatus 1.

It should be noted that the CPU 20 in the content recording and reproducing apparatus 1 corresponds to the control unit 2 (FIG. 29) described above. In like manner, the EEPROM 22 corresponds to the storage unit 3, the RAM 23 to the temporary storage unit 4, the operation keys 24 to the operation unit 5, the network interface 25 to the communication unit 6, the hard disk drive 26 to the internal storage medium drive unit 7 and internal storage medium 8, the rights handling and music processing module 27 and analog processing circuit 28 to the rights handling unit 9 and music processing unit 10, the CD drive 30 to the external storage medium drive unit 12, the USB interface 32 to the interface unit 14, and the display controller 36 to the display processing unit 17.

Figure 4:
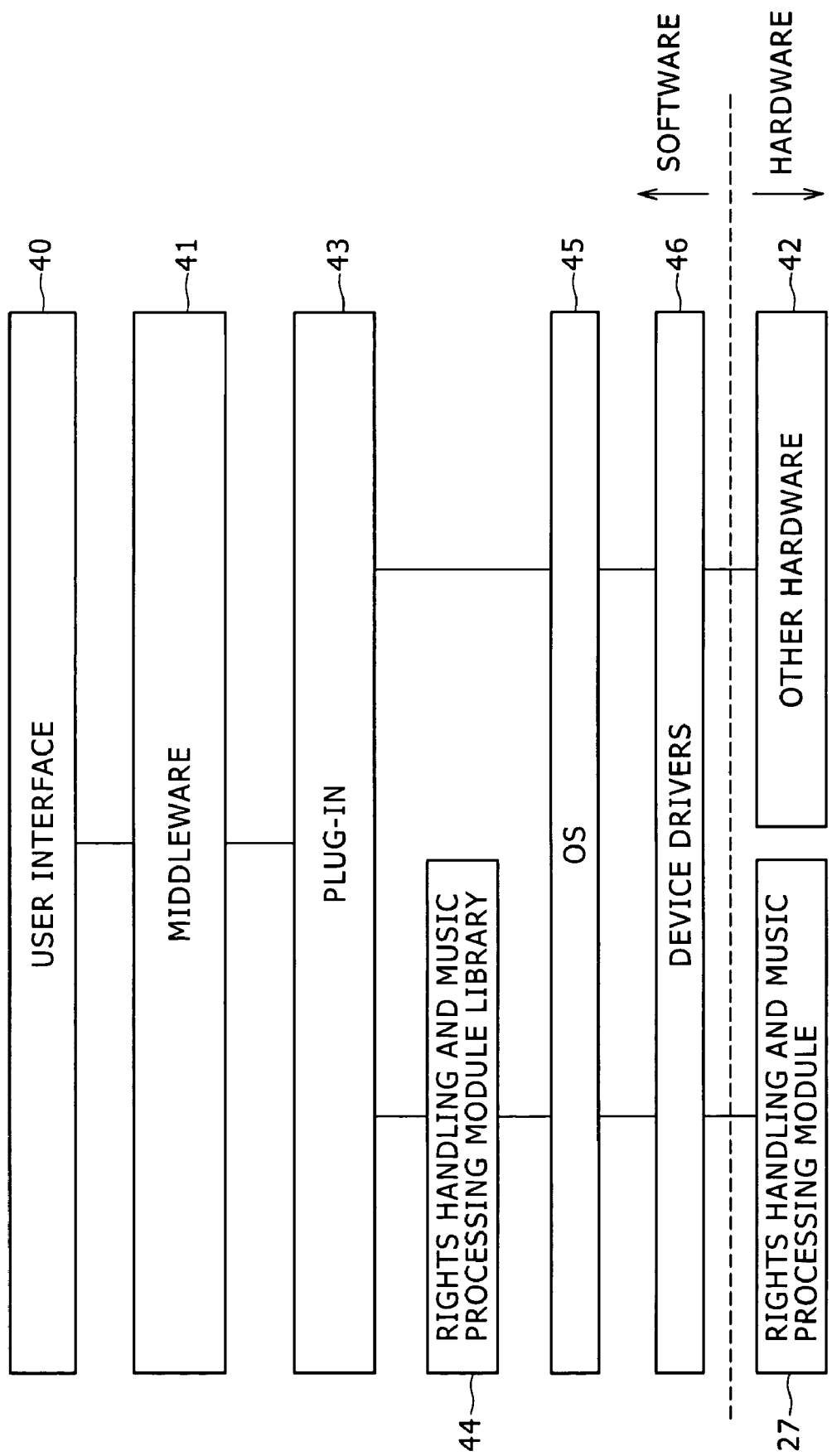
FIG. 4 is a schematic view showing a software structure of the content recording and reproducing apparatus.

Described below with reference to FIG. 4 is the software incorporated in the content recording and reproducing apparatus 1 of which the hardware structure was discussed above by referring to FIG. 3. The incorporated software has a layered structure. In the highest layer is a user interface 40 that causes various kinds of information including music data lists to be displayed on the display unit 37. The user interface 40 is further used to recognize instructions issued by the user operating the operation keys 24 specifying, among others, the start of music reproduction and the selection of desired music contents.

In the layer below the user interface 40 is middleware 41 that generates process execution requests for requesting the rights handling and music processing module 27 and other relevant hardware (e.g., hard disk drive 26 and CD drive 30) to acquire, reproduce, record, or transfer music contents. The middleware 41 also manages databases that may be established on the hard disk drive 26. Furthermore, the middleware 41 generates various kinds of information such as lists of music data recorded on the CD 31 loaded in the CD drive 30, in the USB device 33, or on the hard disk drive 26. The generated information is used primarily to provide displays on the display unit 37.

In the layer below the middleware 41 is a plug-in 43 that generates information constituting process execution instructions for causing the rights handling and music processing module 27 and other relevant hardware 42 to perform various processes in accordance with the process execution requests generated by the middleware 41. The plug-in 43 further carries out an import recording process in which the content recording and reproducing apparatus 1 imports music contents from the outside and records them to the hard disk drive 26. In the layer below the plug-in 43 is a rights handling and music processing module library 44. This library 44 addresses only those of the process execution instructions generated by the plug-in 43 which cause the rights handling and music processing module 27 to perform rights-related processes including generation of the decryption key based on rights information and digital processes such as decoding and encoding of music contents. What the rights handling and music processing module library 44 does specifically is to convert the process execution instructions intended for the module 27 into instructions in a format that can be interpreted by the module 27.

In the layer below the rights handling and music processing module 44 is an OS (Operating System) 45. The plug-in 43, rights handling and music processing module library 44, middleware 41, and user interface 40 all operate on this OS 45. In the layer below the OS 45 are device drivers 46 that allow the OS 45 to recognize the functions of the rights handling and music processing module 27 and other hardware 42. Through the device drivers 46, the OS 45 can provide the rights handling and music processing module 27 and other hardware 42 with the information constituting diverse process execution instructions generated and converted by the plug-in 43 as well as by the rights handling and music processing module library 44.

In addition to the above-described structure, the content recording and reproducing apparatus 1 may compression-encode music data representing the music content of each song (i.e., each track) in the MPEG-1 (Moving Picture Experts Group Phase 1) Audio Layer 3 or MPEG-2 Audio Layer 3 format (called the MP3 format hereunder) and record the resulting encoded music data as audio data files (called MP3 files hereunder) to the USB device 33 connected to the apparatus 1. The content recording and reproducing apparatus 1 may later import MP3 files from the USB device 33 on a track-by-track basis and record the imported MP3 files directly to the hard disk drive 26.

Figure 5:
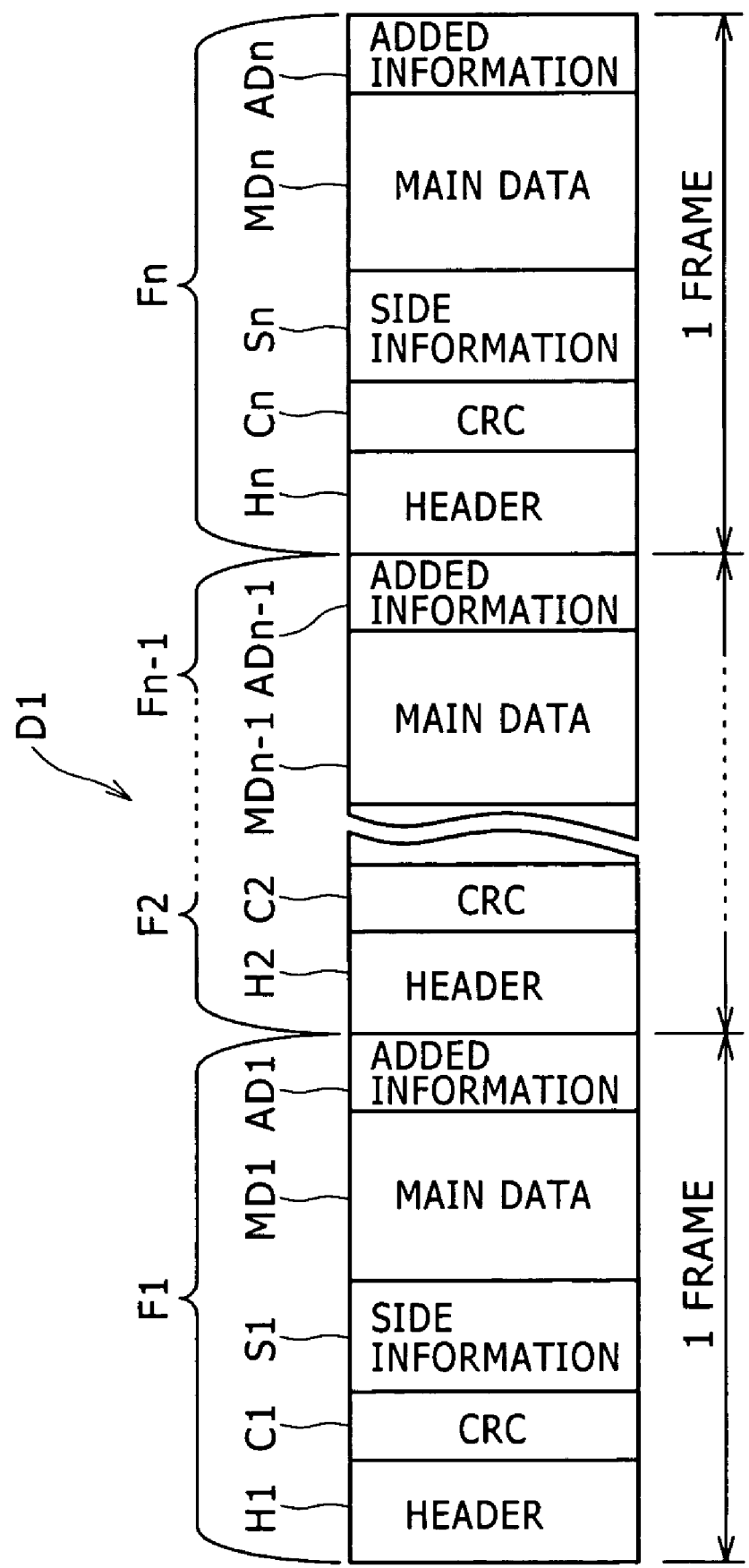
FIG. 5 is a schematic view showing a structure of a one-track MP3 file.

The MP3 format stipulates that each MP3 file be processed in increments of frames. As shown in FIG. 5, a one-track MP3 file D1 is made up of a plurality of continuous frames F1 through Fn. The frames F1 through Fn are constituted, from the frame head onward, by frame headers H1 through Hn, CRC (Cyclic Redundancy Check) code storage fields C1 through Cn, side information storage fields S1 through Sn, main data storage fields MD1 through MDn, and added information storage fields AD1 through ADn.

The main data storage fields MD1 through MDn hold data divisions constituting the encoded music data amounting to one track (the data is called split coded music data). The frame headers H1 through Hn accommodate header data made up of various kinds of information including identification information for identifying each frame header and size information for designating the frame size of each frame. The CRC code storage fields C1 through Cn retain CRC codes used to correct errors that may be found in the split coded music data held in the main data storage fields MD1 through MDn. The added information storage fields AD1 through ADn store diverse kinds of additional information used for such processes as decoding of the split coded music data from the main data storage fields MD1 through MDn.

Figure 6:
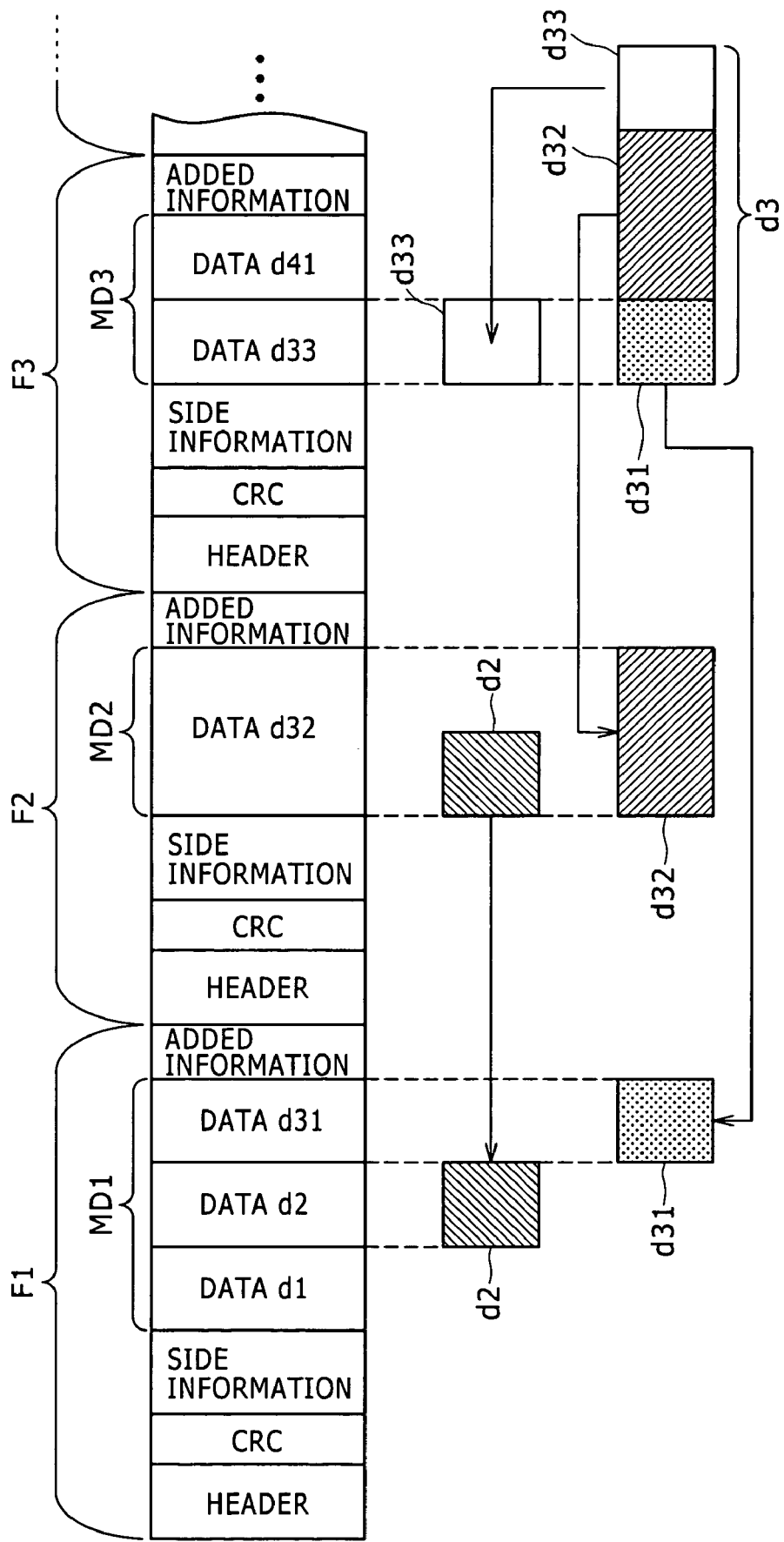
FIG. 6 is a schematic view explanatory of how split coded music data is stored with regard to frames (part 1)

The MP3 format also stipulates that the split coded music data constituting each track be divided into a plurality of split coded music data items which are assigned to the frames F1 through Fn on a one-to-one basis and are stored into the main data storage fields MD1 through MDn respectively. According to the MP3 format, as shown in FIG. 6, one split coded music data item d2 assigned illustratively to the frame F2 may be placed unmodified into the main data storage field MD1 of the frame F1 preceding the frame F2 that normally accommodates the data item d2. At least parts d31 and d32 of another split coded music data item d3 (the parts are called segmented music data items) may be placed respectively into the main data storage fields MD1 and MD2 of the frames F1 and F2 preceding the frame F3 that normally stores these parts. The MP3 file thus structured includes the frame F1 with its main data storage field MD1 holding two split coded music data items d1 and d2 and one segmented music data item d31, the frame F2 with its main data storage field MD2 holding one segmented music data item d32 alone, and the frame F3 with its main data storage field MD3 holding two segmented music data items d33 and d41.

According to the MP3 format, as shown in FIG. 7, storage location notice information called "main_data_begin" is placed into each of the side information storage fields S1 through S3 so that that information will indicate the beginning of each of the split coded music data items d1 through d3 to be stored (i.e., assigned) normally into the frames F1 through F3 respectively. According to the MP3 format, if the split coded music data item d1 to be stored normally into the frame F1 is stored into the frame F1, then the storage location notice information is set illustratively to "0," indicating that the beginning of the split coded music data item d1 is located in this frame F1. If the split coded music data items d2 and d3 to be stored normally into the frames F2 and F3 are stored either unmodified (e.g., as split coded music data item d2) or as the segmented music data item d31 into the preceding frame F1, then the storage location notice information is set so as to represent a data length (i.e., a minus pointer) from the beginning of the frame F2 or F3 (where the data items should normally be located) to the beginning of the split coded music data item d2 or segmented music data item d31, whereby the beginning of the split coded music data item d2 or the segmented music data item d31 is designated. Thus according to the MP3 format, during reproduction of the MP3 file D1, the reproducing apparatus references the frame F1 preceding the frames F2 and F3 in accordance with the storage location notice information in each of the frames F1 through F3 and accomplishes the reproduction process by suitably utilizing the split coded music data items d1 and d2 as well as the segment music data items d31 through d33 and d41.

As shown in FIGS. 8A through 8C, an MP3 file D2 may be edited in such a manner as to be split illustratively into two MP3 files D3 and D4 on the boundary between contiguous frames Fm and Fm+1. Following such split editing, a "trailing" frame Fm of the newly created first-half MP3 file D3 may contain at least part of the split coded music data to be normally stored in a "leading" frame Fm+1 of the newly created second-half MP3 file D4. In the example shown in FIG. 8A, a main data storage field MDm+1 in the leading frame Fm+1 of the second-half MP3 file D4 includes a segment music data item dm+13 as only a part of the split coded music data to be stored in the file D4. The rest of the split coded music data is stored as segmented music data items dm+11 and dm+12 in main data storage fields MDm−1 and MDm of the preceding frames Fm−1 and Fm (i.e., at the trailing frames Fm−1 and Fm of the newly created first-half MP3 file D3).

In the above example of split editing, the leading frame Fm+1 of the second-half MP3 file D4 contains, in the side information storage unit, the storage location notice information indicating where the segmented music data item dm+11 is located in the main data storage field MDm−1 of the frame Fm+1 preceding the second-half MP3 file D4. Upon continuous reproduction of the first-half and second-half MP3 files D3 and D4, the preceding frame Fm−1 (i.e., of the first-half MP3 file) is referenced in accordance with the storage location notice information placed in the leading frame Fm+1 of the second-half MP3 file D4. This makes it possible to reproduce the first-half and the second-half MP3 files D3 and D4 continuously with no problem. However, suppose that an MP3 file D3 different from the above-described first-half MP3 file D3 is followed by the ensuing MP3 file D3 in continuous reproduction. In this case, frames of the preceding different MP3 file are referenced in accordance with the storage location notice information placed in the leading frame Fm+1 of the ensuing MP3 file D4. The reference involves using other kinds of split coded music data or segmented music data which are irrelevant to music reproduction. That means the split coded music data or segmented music data in an MP3 file unrelated to the ensuing MP3 file D4 will also be reproduced, which can result in a notice.

Figure 9:
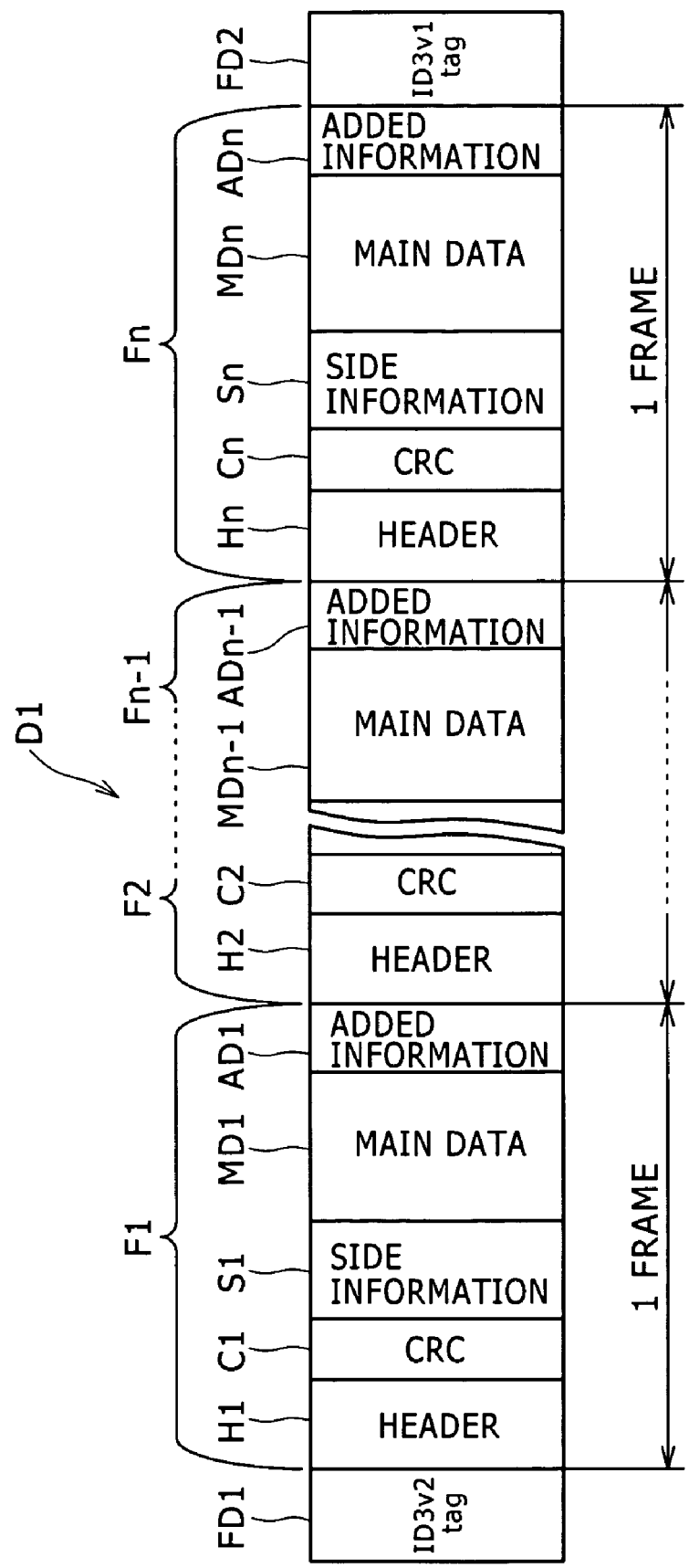
FIG. 9 is a schematic view explanatory of how added information is attached to an MP3 file.
Figure 13:
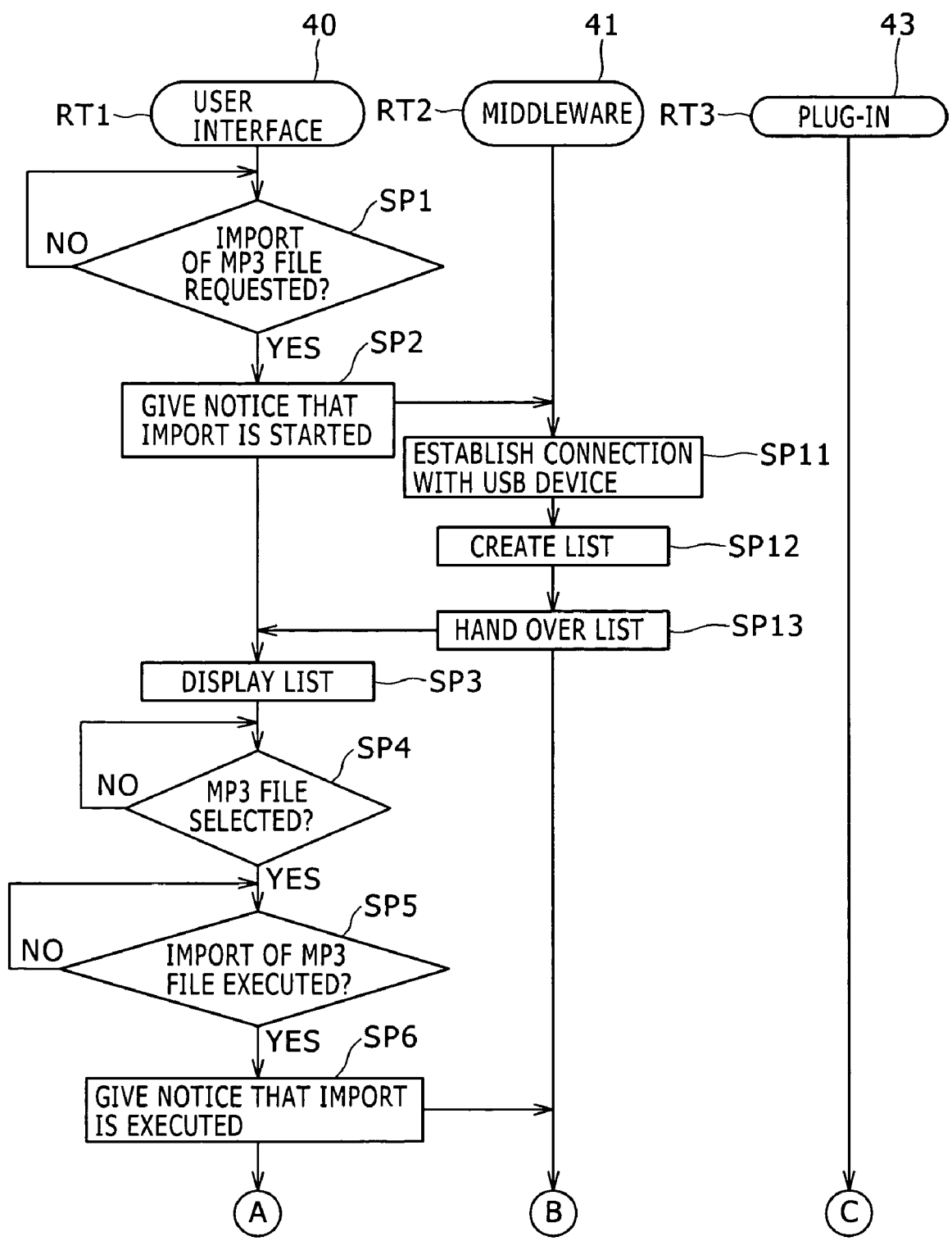
FIG. 13 is a flowchart of steps constituting a file importing and recording procedure (part 1)
Figure 14:
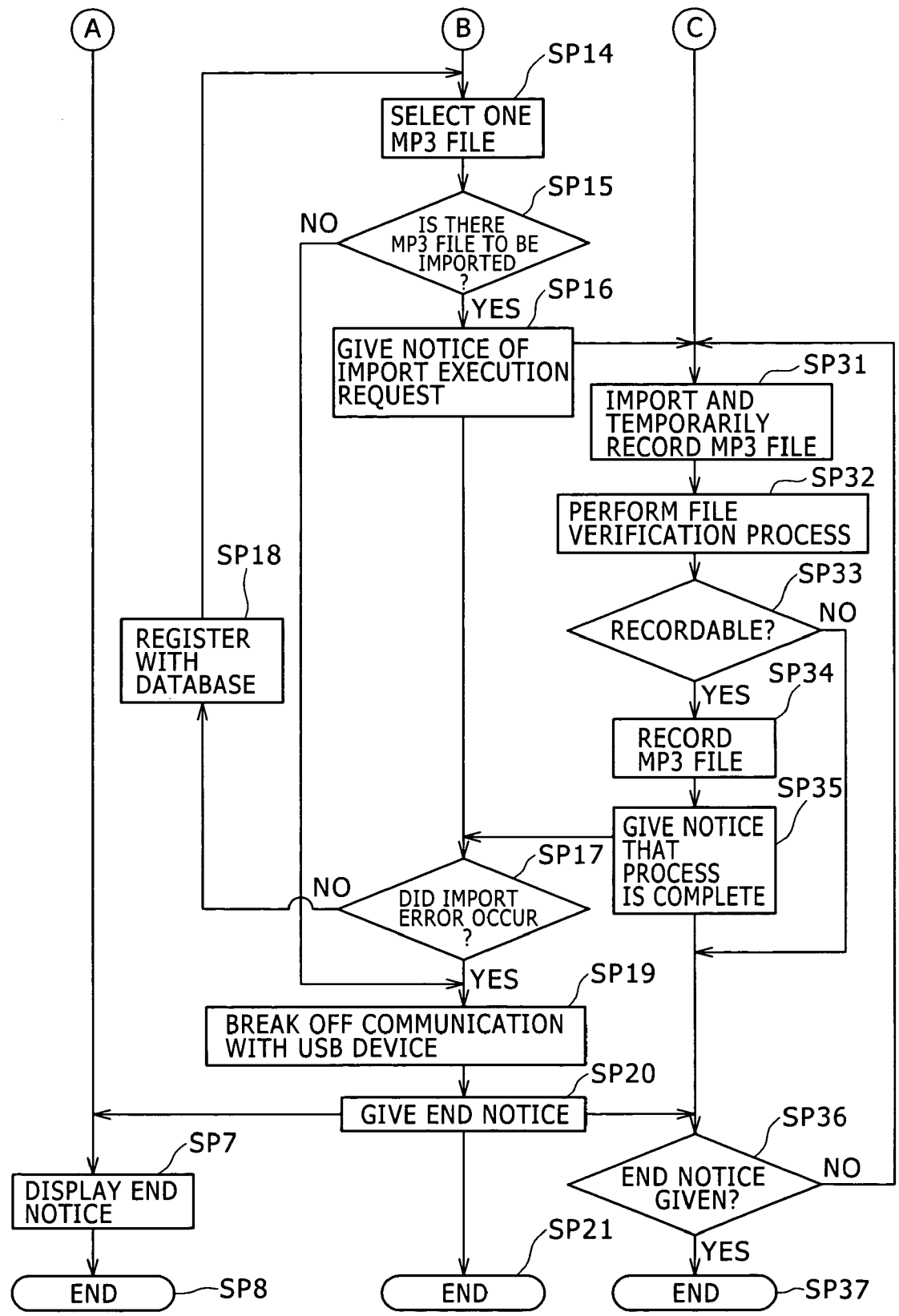
FIG. 14 is a flowchart of more steps constituting the file importing and recording procedure (part 2)

Further according to the MP3 format, as shown in FIG. 9, the one-track MP3 file D1 may be prefixed and suffixed with additional data items FD1 and FD2 called "ID3v2tag" and "ID3v1tag," respectively. The additional data items accommodate attribute information such as the titles of music contents. On a personal computer or like equipment, at least two MP3 files together with their prefixed and suffixed additional data may be edited to be combined. The editing, as shown in FIG. 10, apparently creates a new MP3 file D5 prefixed and suffixed with the additional data items FD3 and FD4 respectively. However, halfway through the newly created MP3 file D5 may appear invalid data ND1 constituted by the additional data that was suffixed to a yet-to-be-edited MP3 file D5A or by the additional data that was prefixed to another unedited MP3 file D5B. The invalid data is detrimental to normal music reproduction (e.g., it is difficult to be reproduced or will generate noise when reproduced).

Furthermore, as shown in FIGS. 11A through 11C, the MP3 file D1 may be created by a compression coding circuit that compression-codes music data. Depending on its specifications, the compression coding circuit may place into a frame header Hn of the trailing frame Fn side information indicating the frame size of the trailing frame Fn erroneously as a frame size FS2, longer than the actual frame size FS1. In that case, if the MP3 file D1 and another MP3 file D6 are reproduced continuously, the trailing frame Fn of the MP3 file D1 will be reproduced in accordance with the incorrect frame size. That is, the trailing frame Fn will be reproduced concurrently with a part F1aa of the frame header in the leading frame F1a of the ensuing MP3 file D6. A noise can result from the process in which the MP3 file D1 is reproduced together with the irrelevant part F1aa of the ensuing MP3 file D6.

By contrast, the content recording and reproducing apparatus 1 of the embodiment of the present invention records MP3 files imported from the USB device 33 for storage onto the hard disk drive 26 in such a manner that they can later be reproduced with no special process additionally carried out. Described below with reference to FIGS. 12 through 15 is a process in which MP3 files are imported and recorded by the content recording and reproducing apparatus (the process will be carried out by execution of a file importing and recording procedure). Although the CPU 20 actually performs the file importing and recording process using the above-described software including the user interface 40, middleware 41, and plug-in 43, these software components will be treated as functional blocks in the subsequent description of the process.

The file importing and recording procedure RT1 is started when the user interface 40 causes the display controller 36 illustratively to display a process selection screen (not shown) on the display unit 37. With the procedure RT1 started, the user interface 40 goes to step SP1 and waits for a request to be made on the process selection screen to import MP3 files in response to the user's operations on the operation keys 24. When the user is found to have made such a request to import MP3 files, the user interface 40 goes to step SP2. In step SP2, the user interface 40 notifies the middleware 41 that MP3 files will start getting imported. Step SP2 is followed by step SP3.

By this time, the middleware 41 started a procedure RT2 illustratively in conjunction with the start-up of the procedure RT1 by the user interface 40. With the procedure RT2 started, the middleware 41 goes to step SP11 and establishes communication with the USB device 33 through the USB interface 32 in keeping with the import start notice coming from the user interface 40. In step SP12, the middleware 41 reads file names or suitable titles of MP3 files track by track from the USB device 33 and, based on the retrieved file names, creates a list of MP3 files importable from the USB device 33 (the list will be called the importable file list hereunder). In step SP13, the middleware 41 hands the importable file list over to the user interface 40 before going to step SP14.

In step SP3, the user interface 40 creates a file selection screen that lists the importable MP3 files based on the importable file list transferred from the middleware 41. The user interface 40 causes the display controller 36 to display the file selection screen thus created on the display unit 37, and goes to step SP4. In step SP4, the user interface 40 waits for MP3 files to be selected on the file selection screen for import from the USB device 33 in response to the user's operations on the operation keys 24. If the user selects MP3 files to be imported from the USB device 33, then step SP5 is reached. In step SP5, the user interface 40 further waits for an MP3 file import request to be made on the file selection screen in response to the user's operations on the operation keys 24. When the user makes the request to execute the MP3 file import, the user interface 40 goes to step SP6. In step SP6, the user interface 40 notifies the middleware 41 of the user-selected MP3 files and of the execution of their import, before going to step SP7.

In step SP14, the middleware 41 starts a series of steps (called the import execution requesting procedure) to make the plug-in 43 import and record the MP3 files in response to the user interface 40 giving notice of the MP3 file import execution. The middleware 41 matches the user-selected MP3 files reported from the user interface 40 against the importable file list, and selects one of the importable MP3 files from the list (i.e., one-track MP3 file) before going to step SP15. If all import-destined MP3 files (i.e., user-selected MP3 files) have been selected from the importable file list so that no more importable file exists, then the middleware 41 skips step SP14 and goes to step SP15. In step SP15, the middleware 41 checks to determine whether there exists any import-destined MP3 file. If the result of the check in step SP15 is affirmative, that means the middleware 41 has yet to finish requesting the import and recording of all user-selected MP3 files. In that case, the middleware 41 goes to step SP16. In step SP16, the middleware 41 creates an import execution request regarding the MP3 file selected in step SP14 and transfers the request to the plug-in 43, before going to step SP17.

By this time, the plug-in 43 started a procedure RT3 illustratively in conjunction with the start-up of the procedure RT1 by the user interface 40. With the procedure RT3 started, the plug-in 43 in step SP31 reads the one-track MP3 file selected by the middleware 41 from the USB device 33 through the USB interface 32 in response to the import execution request made by the middleware 41. The plug-in 43 stores the retrieved MP3 file temporarily into the RAM 23 before going to step SP32. In step SP32, the plug-in 43 carries out a file verification process to verify whether the MP3 file placed temporarily in the RAM 23 can later be reproduced with no problem after it is recorded to the hard disk drive 26. After step SP32, the plug-in 43 goes to step SP33.

In step SP33, the plug-in 43 checks the result of the file verification process to determine whether the MP3 file held temporarily in the RAM 23 can be recorded to the hard disk drive 26. If the result of the check in step SP33 is affirmative, that means the MP3 file in question can be recorded to the hard disk drive 26 and can later be reproduced therefrom with no special process additionally carried out. In that case, the plug-in 43 goes to step SP34. The plug-in 43 then retrieves the MP3 file from the RAM 23, writes the retrieved file to the hard disk drive 26, and goes to step SP35. In step SP35, the plug-in 43 notifies the middleware 41 that the recording of the MP3 file in question is completed, before going to step SP36. In step SP36, the plug-in 43 checks to determine whether the middleware 41 has given notice that the import execution requesting process is terminated. If the result of the check in step SP36 is negative, that means the middleware 41 is still carrying out its import execution requesting procedure and that the middleware 41 can still issue another import execution request to the plug-in 43. In that case, the plug-in 43 goes back to step SP31.

If the result of the check in step SP33 is negative, that means if the MP3 file stored temporarily in the RAM 23 were recorded to the hard disk drive 26, it would be necessary to carry out special processes such as noise source removal on the file during subsequently requested reproduction. In that case, the plug-in 43 reaches step SP36 without recording to the hard disk drive 26 the MP3 file held temporarily in the RAM 23.

In step SP17, in response to the notice coming from the plug-in 43 saying that the recording of the MP3 file has ended, the middleware 41 checks to determine whether an import error occurred while the plug-in 43 was importing the MP3 file from the USB device 33 and recording it temporarily to the RAM 23. If the result of the check in step SP17 is negative, that means the one-track MP3 file was imported from the USB device 33 without interruption and placed normally into the RAM 23 for temporary storage. In other words, the negative result of the check in step SP17 signifies that the file verification process performed on the one-track MP3 file had proved the file to be normally recordable so that that file was recorded to the hard disk drive 26. In this case, the middleware 41 goes to step SP18. In step SP18, the middleware 41 registers the one-track MP3 file that was recorded to the hard disk drive 26 with a database that was established beforehand on the hard disk drive 26 (what is registered is actually made up of attribute information including the name of the MP3 file and its storage location address on the hard disk). After step SP18, the middleware 41 goes back to step SP14.

The middleware 41 repeats cyclically steps SP14 through SP18 until the result of the check in step SP15 becomes negative and until the result of the check in step SP17 becomes affirmative. Thereafter the middleware 41 instructs the plug-in 43 to import the user-selected MP3 files track by track. In turn the plug-in 43 repeats cyclically steps SP31 through SP36 to import the MP3 files successively from the USB device 33. Only if an imported MP3 file is found recordable, it is recorded to the hard disk drive 26. Every time a one-track MP3 file is recorded by the plug-in 43 to the hard disk drive 26, the middleware 41 registers the one-track MP3 file in question with the database.

If the result of the check in step SP15 is negative, that means the middleware 41 has finished requesting the plug-in 43 to import and record all user-selected MP3 files. The middleware 41 then goes to step SP19. In step SP19, the middleware 41 breaks off communication with the USB device 33, before going to step SP20. In step SP20, the middleware 41 notifies the user interface 40 that the importing and recording process of the user-selected MP3 files has normally ended. After step SP20, the middleware 41 goes to step SP21 and terminates the procedure RT2.

If the result of the check in step SP17 is affirmative, that means the import of a one-track MP3 file from the USB device 33 was interrupted halfway due to, say, an inadvertent disconnection of the USB device 33 from the content recording and reproducing apparatus 1. In other words, the affirmative result of the check in step SP17 signifies that although the MP3 file imported from the USB device 33 had been found recordable and was recorded to the hard disk drive 26, only part of the file (i.e., one track) ended up being actually recorded. In such a case, despite the notice from the plug-in 43 indicating that the MP3 file was recorded, the middleware 41 will not register the MP3 file in question with the database. That is, the middleware 41 regards the MP3 file as yet to be recorded to the hard disk drive 26 (only part of the file has been recorded) and goes to step SP19. In step SP19, with the communication with the USB device 33 already broken off, the middleware 41 immediately goes to step SP20. In step SP20, the middleware 41 notifies the user interface 40 that the importing and recording process of the user-selected MP3 files has been aborted halfway through. After step SP20, the middleware 41 goes to step SP21 and terminates the procedure RT2.

If in step SP7 the user interface 40 is notified by the middleware 41 that the importing and recording process of the MP3 files has been normally completed, the user interface 40 in turn notifies the user thereof illustratively using the display unit 37. Thereafter the middleware 41 goes to step SP8 and terminates the procedure RT1. On the other hand, if in step SP7 the user interface 40 is notified by the middleware 41 that the importing and recording process of the MP3 files has failed halfway, the user interface 40 also notifies the user thereof illustratively via the display unit 37. Thereafter the middleware 41 goes to step SP8 and terminates the procedure RT1.

In step SP20, the middleware 41 notifies the plug-in 43 of the termination, either complete or halfway, of the importing and recording process of MP3 files. Thus in step SP36, the plug-in 43 makes the check and finds that the process end notice has been given. Following the affirmative result of the check in step SP36, the plug-in 43 goes to step SP37 and terminates the procedure RT3. In practice, the CPU 20 carries out the above-described file importing and recording procedure in keeping with the user interface 40, middleware 41, and plug-in 43, whereby MP3 files are imported from the USB device 33 and recorded to the hard disk drive 26.

Figure 15:
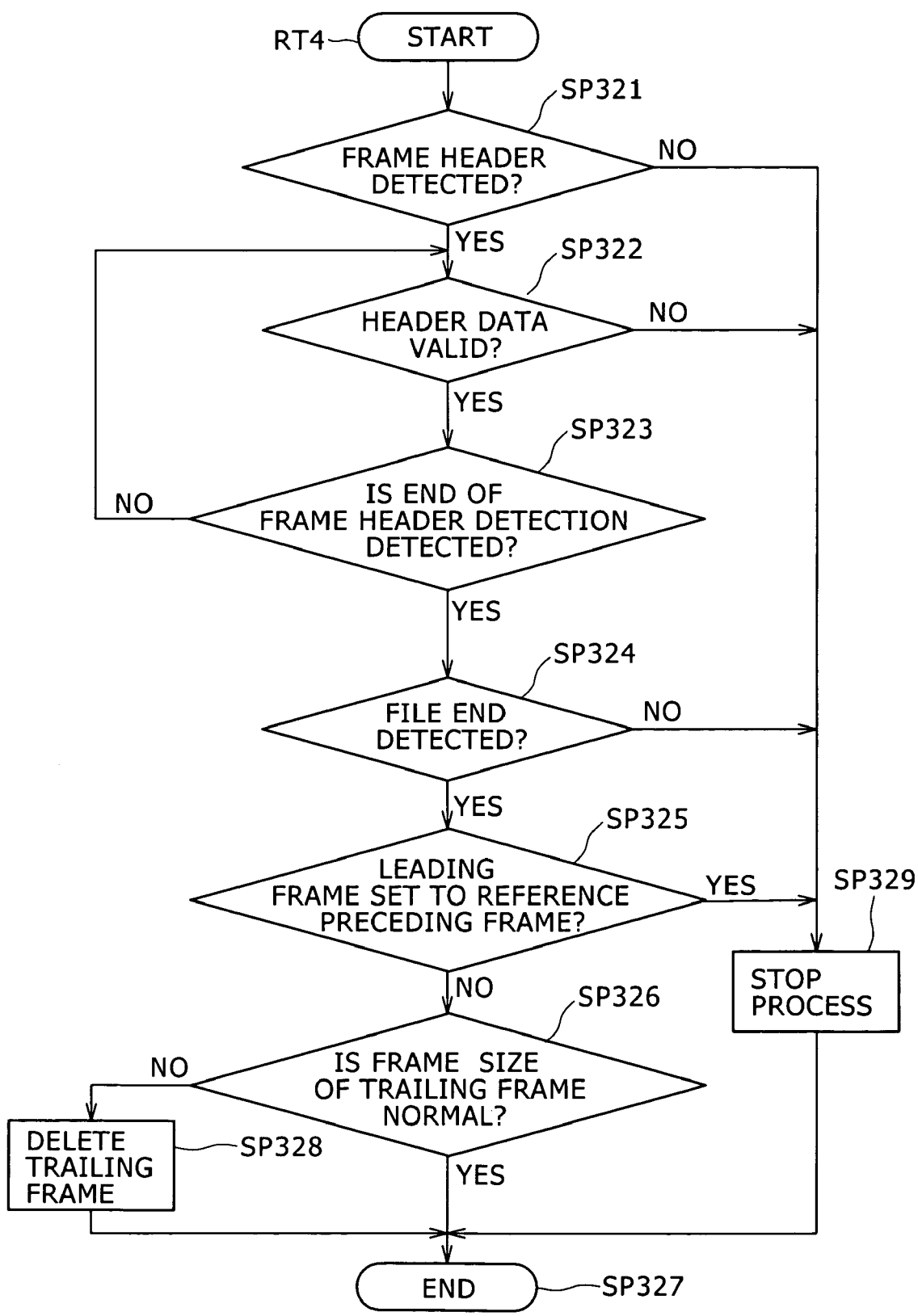
FIG. 15 is a flowchart of steps constituting a file verification procedure.

In step SP32 of the file importing and recording procedure above, the plug-in 43 executes a file verification procedure RT4 shown in FIG. 15. More specifically, the plug-in 43 starts carrying out the file verification procedure RT4 when going to step SP32. With the procedure RT4 started, the plug-in 43 goes to step SP321 and checks to determine whether header identification information is detected during scanning from beginning to end of the MP3 file stored temporarily in the RAM 23. The plug-in 43 checks in step SP321 to see if a frame header of any one frame has been detected in the MP3 file. If the result of the check in step SP321 is affirmative, that means there is a possibility that the temporarily stored MP3 file was properly created to have a valid frame structure according to the MP3 format. When the plug-in 43 in step SP321 scans the MP3 file from beginning to end for header identification information, the presence of a frame in that file is equivalent to the detection of the frame header in the leading frame. In that case, the plug-in 43 goes to step SP322.

In step SP322, the plug-in 43 checks to determine whether the header data held in the frame header detected in step SP321 was created correctly according to the MP3 format. If the result of the check in step SP322 is affirmative, that means the header data was created correctly according to the MP3 format and that the MP3 file in the RAM 23 is thus highly likely to have been created normally. In that case, the plug-in 43 goes to step SP323. In step SP323, the plug-in 43 scans the MP3 file for another header identification information between the frame header found closest to the file end so far on the one hand, and the end of that file on the other hand. In so doing, the plug-in 43 checks to determine whether the end is found of the continuous detection of frame headers in the MP3 file. If the result of the check in step SP323 is negative, that means another frame header is detected within the range of a predetermined data length according to the MP3 format downstream of the frame header found closest to the file end. (Illustratively, the data length is substantially equivalent to a maximum frame size of one frame, called the continuous frame detection range hereunder). In other words, the negative result of the check in step SP323 signifies that the MP3 file in the RAM 23 was structured with continuous frames according to the MP3 format. The plug-in 43 then goes back to step SP322.

Thereafter the plug-in 43 repeats cyclically steps S322 and S323 until the result of the check in step SP322 becomes negative and until the result of the check in step SP323 becomes affirmative. By carrying out the two steps repeatedly, the plug-in 43 verifies whether the MP3 file in the RAM 23 is structured with continuous frames according to the MP3 format. When the result of the check in step SP323 becomes affirmative, that means no frame header has been detected within the range of the continuous frame detection range starting from the frame header found closest to the end of the MP3 file. In other words, the affirmative result of the check in step SP323 signifies that the end is found of the frame header detection process on the MP3 file in the RAM 23. The plug-in 43 then goes to step SP324.

In step SP324, the plug-in 43 scans the MP3 file in the RAM 23 for the end of the file (i.e., file end) downstream of the location where the end of the frame header detection process was detected by scanning. The plug-in 43 scans the MP3 file for a file end illustratively by searching for additional data FD2 (FIG. 9) suffixed to the file, in order to determine whether the file end is detected. If the result of the check in step SP324 is affirmative, that means the plug-in 43 has found the end of the MP3 file without detecting another frame header in the file following the end of the frame header detection process. In other words, the affirmative result of the check in step SP324 signifies that the invalid data ND1 discussed above in reference to FIG. 10 is not found anywhere throughout the file length from beginning to end of the MP3 file stored temporarily in the RAM 23. In that case, the plug-in 43 goes to step SP325.

In step SP325, on the basis of the storage location notice information placed in the leading frame of the MP3 file in the RAM 23, the plug-in 43 checks to determine whether that leading frame is set to reference a preceding frame. If the result of the check in step SP325 is negative, that means the split coded music data assigned to the leading frame of the MP3 file for storage is actually stored in its entirety in that leading frame. In this case, the plug-in 43 goes to step SP326.

In step SP326, on the basis of the size information placed in the trailing file of the MP3 file in the RAM 23, the plug-in 43 checks to determine whether the frame size of that trailing frame is normal. Illustratively, the plug-in 43 measures the physical file size of the MP3 file in the RAM 23 while performing steps SP321 through SP324. Every time a frame header is detected by the cyclic repetition of steps SP321, SP322, and SP323, the plug-in 43 adds up the frame size indicated by the size information held in the detected frame header. These steps when carried out permit calculation of the logical file size of the MP3 file. Then the plug-in 43 compares the physical file size with the logical file size of the target MP3 file (i.e., the physical file end location of the MP3 file is compared with its logical file end location). The result of the comparison is used as the basis for determining whether the trailing frame has a normal frame size.

If the result of the check in step SP326 is affirmative, that means there is a match between the physical and the local file sizes of the MP3 file in the RAM 23 and that the frame size (i.e., size information) placed in the trailing frame is correct. In that case, the plug-in 43 goes to step SP327 and terminates the file verification procedure RT4.

If the result of the check in step SP326 is negative, that means there is a mismatch between the physical and the local file sizes of the MP3 file in the RAM 23 and that the frame size placed in the trailing frame is invalid (i.e., different from the actual size). In other words, the negative result of the check in step SP326 signifies that the MP3 file stored temporarily in the RAM 23 would, during continuous reproduction, entail concurrent reproduction of the leading part of a separate ensuing MP3 file as discussed above with reference to FIGS. 11A through 11C; the leading part of the ensuing MP3 file would come out as a noise during the reproduction. In this case, the plug-in 43 goes to step SP328 and deletes the trailing frame from the MP3 file in the RAM 23. In this manner, the plug-in 43 avoids having a leading portion of the separate subsequent MP3 file reproduced at the same time as the continuous reproduction of the MP3 file. The plug-in 43 then goes to step SP327 and terminates the file verification procedure RT4.

If the result of the check in step SP321 is negative, that means what has been read from the USB device 33 into the RAM 23 for temporary storage is likely to be illegally created data not conforming to the MP3 format. In such a case, the plug-in 43 goes to step SP329. If the result of the check in step SP322 turns out to be negative, that means the header data was apparently created irrespective of the MP3 format and that the MP3 file in the RAM 23 may well have been generated illegally. In this case, the plug-in 43 also goes to step SP329.

If the result of the check in step SP324 is negative, that means a frame header is detected anew before the end of the MP3 file is detected. In other words, the negative result of the check in step SP324 signifies that the invalid data ND1 discussed above in reference to FIG. 10 is contained somewhere between beginning and end of the MP3 file held temporarily in the RAM 23. In this case, too, the plug-in 43 goes to step SP329. If the result of the check in step SP325 turns out to be affirmative, that means one of two things: either no part of the split coded music data assigned to the leading frame of the MP3 file in the RAM 23 is found, or only a part of the data is contained in the leading frame of the file. In other words, the affirmative result of the check in step SP325 signifies that the MP3 file stored temporarily in the RAM 23 was split edited in such a manner that the leading frame of the file will reference a preceding frame during subsequent continuous reproduction. In this case, the plug-in 43 also goes to step SP329.

In step SP329, the plug-in 43 stops execution of the above-described process to verify the MP3 file held temporarily in the RAM 23. The plug-in 43 then goes to step SP327 and terminates the file verification procedure RT4. With the procedure RT4 stopped, the plug-in 43 goes to step SP33 of its own procedure RT3 constituting part of the above-described file importing and recording procedure. With the file verification procedure RT4 terminated following execution of steps SP326 and SP328, the plug-in 43 determines that the MP3 file stored temporarily in the RAM 23 can be continuously reproduced normally without the intervention of special processes such as noise source removal. In that case, in step SP33 of its own procedure RT3 as part of the file importing and recording procedure, the plug-in 43 finds the MP3 file in the RAM 23 to be recordable to the hard disk drive 26.

If the file verification procedure RT4 is terminated following execution of step SP329, the plug-in 43 determines that the MP3 file held temporarily in the RAM 23 is difficult to be normally reproduced either continuously or independently without the intervention of special processes such as noise source removal. In such a case, in step SP33 of its own procedure RT3 as part of the file importing and recording procedure, the plug-in 43 finds the MP3 file in the RAM 23 to be unrecordable to the hard disk drive 26.

As described, every time a one-track MP3 file is read from the USB device 33 and placed temporarily into the RAM 23, the plug-in 43 verifies whether the MP3 file in question can be reproduced normally without undergoing special processes when requested later for continuous or solo reproduction. If the result of the verification shows the MP3 file to be in need of additional special processes upon subsequently requested continuous or solo reproduction, the plug-in 43 avoids recording the file in question to the hard disk drive 26. In this manner, the anticipated increase in the processing load on reproduction is averted.

In the content recording and reproducing apparatus 1 structured as described above, the CPU 20 imports an MP3 file from the USB device 33 and stores the imported file temporarily into the RAM 23. In this state, the CPU 20 checks to determine whether the MP3 file in question was created properly pursuant to the MP3 format. After determining that the MP3 file was correctly created according to the MP3 format, the CPU 20 checks to see if the leading frame of that file is set to reference a preceding frame upon reproduction. If the leading frame of the MP3 file in question is found set to reference any preceding frame, the CPU 20 inhibits the file from getting recorded to the hard disk drive 26.

If the leading frame of the MP3 file is not found set to reference any preceding file, the CPU 20 allows the MP3 file to be recorded to the hard disk drive 26. If the physical frame size of the trailing frame in the MP3 file is found different from the frame size indicated by the size information (i.e., logical frame size) held in that trailing frame, then the CPU 20 deletes the trailing frame before recording the MP3 file to the hard disk drive 26.

With the content recording and reproducing apparatus 1 in use, even if the MP3 file read from the USB device 33 is found to have been created properly according to the MP3 format, the leading frame of the file which is set to reference any preceding frame upon reproduction will result in a noise after the MP3 file in question is recorded unmodified to the hard disk drive 26. That is because when a first MP3 file reproduced so far is followed by a second MP3 file for continuous reproduction, the leading frame of the second MP3 file will trigger a reference to a preceding frame in the first MP3 file for the use of currently irrelevant split coded music data or segmented music data. Such split coded music data or segmented music data constitutes a source of noise.

For that reason, the content recording and reproducing apparatus 1 may read an MP3 file from the USB device 33 but will not record it to the hard disk drive 26 if the MP3 file in question has its leading frame set to reference a preceding frame upon reproduction. The apparatus 1 records to the hard disk drive 26 only those MP3 files of which the leading frame is not set to reference any preceding frame upon reproduction. In other words, the content recording and reproducing apparatus 1 writes to the hard disk drive 26 these MP3 files that can be reproduced with no special process additionally carried out during subsequent continuous reproduction.

The content recording and reproducing apparatus 1, when structured as described above, reads one MP3 file at a time from the USB device 33, records it temporarily into the RAM 23, and checks to determine if the leading frame of the MP3 file in question is set to reference any preceding frame during reproduction. Depending on the result of the check, the apparatus 1 records or does not record the MP3 file held temporarily in the RAM 23 to the hard disk drive 26. In this manner, the content recording and reproducing apparatus 1 can record to the hard disk drive 26 only those MP3 files that can be reproduced normally without undergoing any special processes when later requested for continuous reproduction. The content recording and reproducing apparatus 1 can thus avert the anticipated increase in processing load during subsequent consecutive reproduction.

If an MP3 file whose trailing frame has an invalid frame size were recorded to the hard disk drive 26, that trailing frame with its incorrect size would be reproduced as part of the leading frame of the ensuing MP3 file during subsequent continuous reproduction spanning a plurality of files. The concurrently reproduced trailing frame would generate a noise. Whereas the leading frame of the MP3 file is not found set to reference the preceding file, the physical size of the trailing frame may turn out to be different from the logical frame size stored in the trailing frame. In that case, the content recording and reproducing apparatus 1 deletes the trailing frame of the MP3 file before recording the MP3 file in question to the hard disk drive 26. In this manner, where MP3 files stored on the hard disk drive 26 are subsequently reproduced continuously, none of the files will generate a noise when their trailing frames are reproduced. In other words, upon continuous reproduction of multiple MP3 files from the hard disk drive 26, the content recording and reproducing apparatus 1 can reproduce each MP3 file without performing any special process to reproduce the trailing frame normally. The apparatus 1 can thus prevent the anticipated increase in processing load during subsequent continuous reproduction.

It might happen that during continuous detection of frame headers from beginning to end of an MP3 file read from the USB device 33, the end of frame header detection is recognized but another frame header is again detected after a while within the file. In such a case, the content recording and reproducing apparatus 1 considers the MP3 file to include invalid data ND1 and does not record the file to the hard disk drive 26. In other words, if the MP3 file read from the USB device 33 and found containing the invalid data ND1 were recorded to the hard disk drive 26, the invalid data ND1 would make it difficult for the content recording and reproducing apparatus 1 to correctly reproduce the MP3 file. The apparatus 1 may be required to find and remove the invalid data ND1 before normally reproducing the MP3 file in question. According to the embodiment of the present invention, the content recording and reproducing apparatus 1 does not record such an MP3 file to the hard disk drive 26. By averting the situation where special processes are to be carried out to find and remove the invalid data ND1 before subsequent reproduction, the content recording and reproducing apparatus 1 can prevent the anticipated increase in processing load during the ensuing reproduction of the MP3 file.

(3) Other Embodiments

In the foregoing description of the embodiment of the present invention, the content recording and reproducing apparatus 1 was shown verifying each MP3 file read from the USB device 33 and recording or not recording the file to the hard disk drive 26 depending on the result of the verification. Alternatively, the content recording and reproducing apparatus 1 may verify MP3 files from diverse sources such as other storage media such including CDs, shared servers on the network, or content delivery servers on the network; and may record or not record each MP3 file to the hard disk drive 26 depending on the result of the verification. If additional data items FD1 and FD2 are found prefixed and suffixed to an MP3 file imported from the outside, the content recording and reproducing apparatus 1 may remove the additional data items before recording the MP3 file to the hard disk drive 26.

In the foregoing description, the inventive content recording and reproducing apparatus 1 was shown not to record to the hard disk drive 26 any MP3 file whose leading frame is set to reference a preceding frame upon reproduction. Alternatively, the content recording and reproducing apparatus 1 may be arranged to exclude that kind of MP3 file only from the category of files to be reproduced consecutively for fear that the leading frame will generate a noise upon consecutive reproduction; the apparatus 1 may let the MP3 file in question be reproduced solo instead. This arrangement is implemented illustratively by recording such MP3 files to the hard disk drive 26 together with information for causing the files to be excluded solely from continuous reproduction. When arranged in this manner, the content recording and reproducing apparatus 1 can prevent the anticipated increase in processing load during subsequent consecutive reproduction of MP3 files just as effectively as the above-described embodiment. Likewise, the content recording and reproducing apparatus 1 may be arranged to record any MP3 file whose trailing frame has an incorrect frame to the hard disk drive 26, not deleting the trailing frame but furnishing the file with information for causing the file to be excluded solely from consecutive reproduction for fear that the incorrectly sized trailing frame will generate a noise upon continuous reproduction. This arrangement also allows the MP3 files held on the hard disk drive 26 to be reproduced independently.

In the foregoing description, where the logical size of the trailing frame was found longer than its physical size in an MP3 file, the inventive content recording and reproducing apparatus 1 was shown to delete that trailing frame before recording the MP3 file to the hard disk drive 26. Alternatively, if the logical size of the trailing frame is found shorter than its physical size in an MP3 file, the content recording and reproducing apparatus 1 may either delete the trailing frame or truncate part of the physical frame size to conform to the logical frame size before recording to the MP3 file to the hard disk drive 26.

In the foregoing description, the embodiment of the present invention was shown applied to the data recording apparatus 100 and content recording and reproducing apparatus 1 discussed above in reference to FIGS. 1 through 15. Alternatively, the invention may be applied to a wide variety of other data recording apparatuses including information processing apparatuses such as computers, mobile phones, PDAs (Personal Digital Assistants), and game consoles; and recording and reproducing apparatuses such as DVD (Digital Versatile Disc) recorders and hard disk recorders.

In the foregoing description, the inventive data recording program was shown implemented in the form of the user interface 40, middleware 41, and plug-in 43 discussed above in reference to FIGS. 1 through 15. The CPU 20 was shown executing the file importing and recording procedure discussed above in reference to FIGS. 12 through 15 by resorting to the user interface 40, middleware 41, and plug-in 43. Alternatively, a data recording program of any other suitable structure according to the invention may be utilized. From an appropriate program storage medium carrying the data recording program, the program may be installed into the content recording and reproducing apparatus 1 whereby the file importing and recording procedure may be carried out.

In the foregoing description, the audio data and the MP3 file discussed above in reference to FIGS. 1 through 15 were shown as the audio data applicable to the present invention. Alternatively, any audio data with a suitable frame structure pursuant to a wide variety of formats may be used in conjunction with the inventive arrangements.

In the foregoing description, the external storage media for storing audio data were shown implemented in the form of the external storage medium 102 and the external device 15 and USB device 33 connected to the content recording and reproducing apparatus 1, as discussed above in reference to FIGS. 1 through 15. Alternatively, a wide variety of other external storage media such as the external storage medium 13 (e.g., CD-RAM) and servers on the network may be used as long as they can store audio data in a manner allowing the data to be reproduced by the content recording and reproducing apparatus 1.

In the foregoing description, the temporary storage media for accommodating the audio data retrieved from the external storage media were shown implemented in the form of the temporary storage medium 103 in the data recording apparatus 100 and the temporary storage unit 4 and RAM 23 in the content recording and reproducing apparatus 1, as discussed above in reference to FIGS. 1 through 15. Alternatively, a wide variety of other temporary storage media may be adopted, including a removable storage medium attached to the content recording and reproducing apparatus 1.

In the foregoing description, the first recording unit that retrieves audio data from the external storage medium and records the retrieved data to the temporary storage in response to an audio data import request was shown implemented in the form of the first recording unit 101 in the data recording apparatus 100 and the control unit 2 and CPU 20 in the content recording and reproducing apparatus 1 as discussed above in reference to FIGS. 1 through 15. Alternatively, a wide variety of other first recording units may be adopted, including a hardware-structured recording circuit that reads audio data from the external storage medium and stores the retrieved data into the temporary storage medium in response to an audio data import request.

In the foregoing description, the detection unit 104 in the data recording apparatus 100 or the control unit 2 and CPU 20 in the content recording and reproducing apparatus 1 discussed above in reference to FIGS. 1 through 15 were shown to act as the detection arrangement detecting whether the leading frame of the audio data recorded temporarily onto the temporary storage medium by the first recording unit is set to reference any preceding frame. Alternatively, a wide variety of other detection units may be utilized, including a hardware-structured detection circuit designed to detect whether the leading frame of the audio data recorded temporarily onto the temporary storage medium by the first recording unit is set to reference any preceding frame.

In the foregoing description, the second recording unit 105 in the data recording apparatus 100 or the internal storage medium drive unit 7 and CPU 20 in the content recording and reproducing apparatus 1 discussed above in reference to FIGS. 1 through 15 where shown to serve as the second recording unit that records the audio data placed on the temporary storage medium to another storage medium in accordance with the result of the detection by the detection unit. Alternatively, a wide variety of other detection units may be adopted, including a hardware-structured recording circuit designed to record the audio data held on the temporary storage medium to another storage medium according to the result of the detection by the detection unit.

Also in the foregoing description, the storage medium 106 in the data recording apparatus 100 or the internal storage medium 8 and hard disk drive 26 in the content recording and reproducing apparatus 1 discussed above in reference to FIGS. 1 through 15 were shown to act as the storage medium that records the audio data that was held on the temporary storage medium. Alternatively, a wide variety of other storage media may be used, including a removable storage medium attached to the content recording and reproducing apparatus 1.

It should be understood by those skilled in the art that various other modifications, combinations, sub-combinations and alterations may occur depending on design requirements and other factor in so far as they are within the scope of the appended claims or the equivalents thereof.

What is claimed is:

1. A data recording method causing a data recording apparatus to record audio data on a storage medium, the method comprising:

recording audio data onto a temporary storage medium, the audio data being retrieved from an external storage medium in response to an audio data import request;

detecting whether a storage location notice information of a leading frame of said audio data references audio data items in a preceding frame, the storage location notice information representing a data length from a beginning of the leading frame to a location of the audio data items in the preceding frame; and recording said audio data held on said temporary storage medium to a storage medium in response to said detection.

2. The data recording method according to claim 1, wherein recording of said audio data to said storage medium is stopped because of invalid data existing within said audio data when, during sequential detection of frame headers from said audio data, an end to the detection of a frame header is followed by the detection of another frame header.

3. The data recording method according to claim 1, wherein said audio data is recorded to the storage medium excluding a trailing frame when an end position indicated by a frame header of said trailing frame fails to match an end position determined by a size of said audio data.

4. A data recording apparatus comprising:

a first recording unit configured to record audio data onto a temporary storage medium following retrieval of said audio data from an external storage medium in response to an audio data import request;

a detection unit configured to detect whether a storage location notice information of a leading frame of said audio data references audio data items in a preceding frame, the storage location notice information representing a data length from a beginning of the leading frame to a location of the audio data items in the preceding frame; and a second recording unit configured to record said audio data held on said temporary storage medium to a storage medium in accordance with a detection outcome.

5. A computer-readable medium storing computer-readable instructions thereon, the computer-readable instructions when executed by a computer cause the computer to perform the method comprising:

recording audio data onto a temporary storage medium following retrieval of said audio data from an external storage medium in response to an audio data import request;

detecting whether a storage location notice information of a leading frame of said audio data held on said temporary storage medium references audio data items in a preceding frame, the storage location notice information representing a data length from a beginning of the leading frame to a location of the audio data items in the preceding frame; and recording said audio data held on said temporary storage medium to a storage medium in response to said detection.

* * * * *